US012300152B2

(12) United States Patent
Zhang et al.

(10) Patent No.: US 12,300,152 B2
(45) Date of Patent: May 13, 2025

(54) PIXEL CIRCUIT, DRIVING METHOD THEREOF, DISPLAY SUBSTRATE AND DISPLAY DEVICE

(71) Applicant: BOE Technology Group Co., Ltd., Beijing (CN)

(72) Inventors: Can Zhang, Beijing (CN); Ning Cong, Beijing (CN); Can Wang, Beijing (CN); Jinfei Niu, Beijing (CN); Jingjing Zhang, Beijing (CN); Minghua Xuan, Beijing (CN); Xiaochuan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/022,173

(22) PCT Filed: Jun. 17, 2022

(86) PCT No.: PCT/CN2022/099598
§ 371 (c)(1),
(2) Date: Feb. 20, 2023

(87) PCT Pub. No.: WO2023/240638
PCT Pub. Date: Dec. 21, 2023

(65) Prior Publication Data
US 2025/0078726 A1 Mar. 6, 2025

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01)

(58) Field of Classification Search
CPC ............. G09G 3/32; G09G 2300/0819; G09G 2300/0852
See application file for complete search history.

(56) References Cited

U.S. PATENT DOCUMENTS

2017/0278462 A1 9/2017 Li et al.
2019/0051238 A1* 2/2019 Zhang .................. G09G 3/3258
(Continued)

FOREIGN PATENT DOCUMENTS

CN 106782332 A 5/2017
CN 110972503 A 4/2020
(Continued)

*Primary Examiner* — Andrew Sasinowski
(74) *Attorney, Agent, or Firm* — Ling Wu; Stephen Yang; Ling and Yang Intellectual Property

(57) ABSTRACT

A pixel circuit, a driving method thereof, a display substrate and a display device are disclosed. The pixel circuit includes a driving circuit and a light-emitting element, the driving circuit is configured to provide a driving current and control a conducting duration of a current pathway between the first power supply terminal and the second power supply terminal; the light-emitting element is configured to receive the driving current in the current pathway and emit light; the driving circuit includes a current control sub-circuit and a duration control sub-circuit; the current control sub-circuit is configured to provide a driving current to the first node under the control of the first scanning signal terminal, the first data signal terminal and the first power supply terminal in a display stage and a non-display stage.

20 Claims, 14 Drawing Sheets

(56) References Cited

U.S. PATENT DOCUMENTS

| | | | | |
|---|---|---|---|---|
| 2020/0027402 | A1* | 1/2020 | Xiao | G09G 3/3258 |
| 2021/0158757 | A1 | 5/2021 | Xuan | |
| 2021/0166629 | A1 | 6/2021 | Yue et al. | |
| 2021/0167161 | A1* | 6/2021 | Yang | H10K 59/353 |
| 2021/0225261 | A1 | 7/2021 | Xuan et al. | |
| 2022/0130331 | A1* | 4/2022 | Liu | G09G 3/3233 |
| 2023/0419904 | A1* | 12/2023 | Kuang | G09G 3/3233 |

FOREIGN PATENT DOCUMENTS

| | | | |
|---|---|---|---|
| CN | 210378422 | U | 4/2020 |
| CN | 210378423 | U | 4/2020 |
| CN | 111243498 | A | 6/2020 |
| CN | 111477162 | A | 7/2020 |
| JP | 2020-56967 | A | 4/2020 |

* cited by examiner

PIXEL CIRCUIT, DRIVING METHOD THEREOF, DISPLAY SUBSTRATE AND DISPLAY DEVICE

CROSS-REFERENCE TO RELATED APPLICATION

The present application is a U.S. National Phase Entry of International Application No. PCT/CN2022/099598 having an international filing date of Jun. 17, 2022. The above-identified application is hereby incorporated by reference.

TECHNICAL FIELD

The present disclosure relates to, but is not limited to, the field of display technology, and more particularly, to a pixel circuit, a driving method thereof, a display substrate and a display device.

BACKGROUND

Silicon-based light-emitting diode display devices are also known as silicon-based LED display devices. Silicon-based LED display devices are manufactured using mature complementary metal oxide semiconductor (CMOS) integrated circuit technology, have advantages such as small size, high pixels per inch (PPI), high refresh rate, etc., and are widely used in various fields such as medicine, military affairs, aeronautics and astronautics and consumer electronics, especially in near-to-eye display fields such as wearable devices, virtual reality (VR) or augmented reality (AR).

SUMMARY

The following is a summary of subject matters described herein in detail. The summary is not intended to limit the protection scope of the claims.

In a first aspect, the present disclosure provides a pixel circuit including a driving circuit and a light-emitting element connected in series between a first power supply terminal and a second power supply terminal; the driving circuit is configured to provide a driving current and control a conducting duration of a current pathway between the first power supply terminal and the second power supply terminal; the light-emitting element is configured to receive the driving current in the current pathway and emit light; the driving circuit includes a current control sub-circuit and a duration control sub-circuit;

the current control sub-circuit, electrically connected to a first scanning signal terminal, a first data signal terminal, a first power supply terminal and a first node, respectively, is configured to provide a driving current to the first node under the control of the first scanning signal terminal, the first data signal terminal and the first power supply terminal;

the duration control sub-circuit, electrically connected to a second scanning signal terminal, a third scanning signal terminal, a second data signal terminal, a first control signal terminal, a reset signal terminal, a first initial signal terminal and a second initial signal terminal, the first node and a second node, respectively, is configured to provide a signal of the first node to the second node under the control of the second scanning signal terminal, the third scanning signal terminal, the second data signal terminal, the first control signal terminal, the reset signal terminal, the first initial signal terminal and the second initial signal terminal; and the light-emitting element is electrically connected to the second node and a second power supply terminal, respectively.

In some possible implementations, when a signal of the reset signal terminal is an active level signal, signals of the first scanning signal terminal, the second scanning signal terminal and the third scanning signal terminal are inactive level signals;

when the signal of the first scanning signal terminal is an active level signal, the signal of the second scanning signal terminal is an active level signal, and the signals of the reset signal terminal and the third scanning signal terminal are inactive level signals;

when the signal of the third scanning signal terminal is an active level signal, the signals of the reset signal terminal, the second scanning signal terminal and the third scanning signal terminal are inactive level signals;

a signal of the first control signal terminal is a ramp signal; and voltage values of signals of the first initial signal terminal and the second initial signal terminal are constant.

In some possible implementations, the current control sub-circuit, also electrically connected to a fourth scanning signal terminal, is configured to provide a driving current to the first node under the control of the first scanning signal terminal, the fourth scanning signal terminal, the first data signal terminal and the first power supply terminal.

In some possible implementations, when the signal of the first scanning signal terminal is an active level signal, a signal of the fourth scanning signal terminal is an active level signal.

In some possible implementations, the driving circuit further includes a node control sub-circuit;

the node control sub-circuit, electrically connected to a fifth scanning signal terminal, a second control signal terminal and the first node, respectively, is configured to provide a signal of the second control signal terminal to the first node or read the signal of the first node to the second control signal terminal under the control of the fifth scanning signal terminal; and a voltage value of the signal of the second control signal terminal is constant in a display stage.

In some possible implementations, when the signal of the first scanning signal terminal is an active level signal, a signal of the fifth scanning signal terminal is an active level signal.

In some possible implementations, the current control sub-circuit includes a first writing sub-circuit, a first storage sub-circuit and a driving sub-circuit;

the first writing sub-circuit, electrically connected to the first scanning signal terminal, the first data signal terminal and a third node, respectively, is configured to provide a signal of the first data signal terminal to the third node under the control of the first scanning signal terminal;

the first storage sub-circuit, electrically connected to the third node and a third power supply terminal, respectively, is configured to store a voltage difference between signals of the third node and the third power supply terminal, or electrically connected to the first node and the third node, respectively, is configured to store a voltage difference between the signals of the first node and the third node; and the driving sub-circuit, electrically connected to the first power supply terminal, the first node and the third node, respectively, is configured to provide a driving current to the first node under the control of the third node and the first power supply terminal.

In some possible implementations, the current control sub-circuit includes a first writing sub-circuit, a first storage sub-circuit and a driving sub-circuit;

the first writing sub-circuit, electrically connected to the first scanning signal terminal, the fourth scanning signal terminal, the first data signal terminal and a third node, respectively, is configured to provide a signal of the first data signal terminal to the third node under the control of the first scanning signal terminal and the fourth scanning signal terminal;

the first storage sub-circuit, electrically connected to the third node and a third power supply terminal, respectively, is configured to store a voltage difference between signals of the third node and the third power supply terminal, or electrically connected to the first node and the third node, respectively, is configured to store a voltage difference between the signals of the first node and the third node; and the driving sub-circuit, electrically connected to the first power supply terminal, the first node and the third node, respectively, is configured to provide a driving current to the first node under the control of the third node and the first power supply terminal.

In some possible implementations, the first storage sub-circuit includes a first capacitor, and the driving sub-circuit includes a first transistor;

a control electrode of the first transistor is electrically connected to the third node, a first electrode of the first transistor is electrically connected to the first power supply terminal, and a second electrode of the first transistor is electrically connected to the first node; and one plate of the first capacitor is electrically connected to the third node, and the other plate of the first capacitor is electrically connected to the third power supply terminal or the first node.

In some possible implementations, the first writing sub-circuit includes a second transistor; and a control electrode of the second transistor is electrically connected to the first scanning signal terminal, a first electrode of the second transistor is electrically connected to the first data signal terminal, and a second electrode of the second transistor is electrically connected to the third node.

In some possible implementations, the first writing sub-circuit includes a second transistor and a third transistor;

a control electrode of the second transistor is electrically connected to the first scanning signal terminal, a first electrode of the second transistor is electrically connected to the first data signal terminal, and a second electrode of the second transistor is electrically connected to the third node;

a control electrode of the third transistor is electrically connected to the fourth scanning signal terminal, a first electrode of the third transistor is electrically connected to the first data signal terminal, and a second electrode of the third transistor is electrically connected to the third node; and the second transistor and the third transistor are of different types.

In some possible implementations, the node control sub-circuit includes a fourth transistor; and a control electrode of the fourth transistor is electrically connected to the fifth scanning signal terminal, a first electrode of the fourth transistor is electrically connected to the second control signal terminal, and a second electrode of the fourth transistor is electrically connected to the first node.

In some possible implementations, the duration control sub-circuit includes a second writing sub-circuit, a second storage sub-circuit, a reset sub-circuit and an output control sub-circuit;

the second storage sub-circuit, electrically connected to a fourth node and a fifth node, respectively, is configured to store a voltage difference between signals of the fourth node and the fifth node;

the second writing sub-circuit, electrically connected to the second scanning signal terminal, the third scanning signal terminal, the second data signal terminal, the first control signal terminal and the fifth node, respectively, is configured to provide a signal of the second data signal terminal to the fifth node under the control of the second scanning signal terminal, and provide the signal of the first control signal terminal to the fifth node under the control of the third scanning signal terminal;

the reset sub-circuit, electrically connected to the reset signal terminal, the first initial signal terminal, the second initial signal terminal, the fourth node and the fifth node, respectively, is configured to provide the signal of the first initial signal terminal to the fourth node and provide the signal of the second initial signal terminal to the fifth node under the control of the reset signal terminal; and the output control sub-circuit, electrically connected to the first node, the second node and the fourth node, respectively, is configured to provide the signal of the first node to the second node under the control of the fourth node.

In some possible implementations, the output control sub-circuit includes a fifth transistor, and the second storage sub-circuit includes a second capacitor;

a control electrode of the fifth transistor is electrically connected to the fourth node, a first electrode of the fifth transistor is electrically connected to the first node, and a second electrode of the fifth transistor is electrically connected to the second node; and one plate of the second capacitor is electrically connected to the fourth node, and the other plate of the second capacitor is electrically connected to the fifth node.

In some possible implementations, the second writing sub-circuit includes a sixth transistor and a seventh transistor;

a control electrode of the sixth transistor is electrically connected to the second scanning signal terminal, a first electrode of the sixth transistor is electrically connected to the second data signal terminal, and a second electrode of the sixth transistor is electrically connected to the fifth node; and a control electrode of the seventh transistor is electrically connected to the third scanning signal terminal, a first electrode of the seventh transistor is electrically connected to the first control signal terminal, and a second electrode of the seventh transistor is electrically connected to the fifth node.

In some possible implementations, the reset sub-circuit includes an eighth transistor and a ninth transistor;

a control electrode of the eighth transistor is electrically connected to the reset signal terminal, a first electrode of the eighth transistor is electrically connected to the first initial signal terminal, and a second electrode of the eighth transistor is electrically connected to the fourth node; and a control electrode of the ninth transistor is electrically connected to the reset signal terminal, a first electrode of the ninth transistor is electrically connected to the second initial signal terminal, and a second electrode of the ninth transistor is electrically connected to the fifth node.

In some possible implementations, the current control sub-circuit includes a first transistor, a second transistor and a first capacitor, and the duration control sub-circuit includes fifth transistor through ninth transistor and a second capacitor;

a control electrode of the first transistor is electrically connected to the third node, a first electrode of the first transistor is electrically connected to the first power supply terminal, and a second electrode of the first transistor is electrically connected to the first node;

a control electrode of the second transistor is electrically connected to the first scanning signal terminal, a first electrode of the second transistor is electrically connected to the first data signal terminal, and a second electrode of the second transistor is electrically connected to the third node;

a control electrode of the fifth transistor is electrically connected to the fourth node, a first electrode of the fifth transistor is electrically connected to the first node, and a second electrode of the fifth transistor is electrically connected to the second node;

a control electrode of the sixth transistor is electrically connected to the second scanning signal terminal, a first electrode of the sixth transistor is electrically connected to the second data signal terminal, and a second electrode of the sixth transistor is electrically connected to the fifth node;

a control electrode of the seventh transistor is electrically connected to the third scanning signal terminal, a first electrode of the seventh transistor is electrically connected to the first control signal terminal, and a second electrode of the seventh transistor is electrically connected to the fifth node;

a control electrode of the eighth transistor is electrically connected to the reset signal terminal, a first electrode of the eighth transistor is electrically connected to the first initial signal terminal, and a second electrode of the eighth transistor is electrically connected to the fourth node;

a control electrode of the ninth transistor is electrically connected to the reset signal terminal, a first electrode of the ninth transistor is electrically connected to the second initial signal terminal, and a second electrode of the ninth transistor is electrically connected to the fifth node;

one plate of the first capacitor is electrically connected to the third node, and the other plate of the first capacitor is electrically connected to the third power supply terminal or the first node;

one plate of the second capacitor is electrically connected to the fourth node, and the other plate of the second capacitor is electrically connected to the fifth node; and the first transistor, the second transistor, and the fifth transistor through ninth transistor are of the same type and are all metal oxide semiconductor transistors.

In some possible implementations, the current control sub-circuit includes a first transistor, a second transistor, a third transistor and a first capacitor, the duration control sub-circuit includes fifth transistor through ninth transistor and a second capacitor;

a control electrode of the first transistor is electrically connected to the third node, a first electrode of the first transistor is electrically connected to the first power supply terminal, and a second electrode of the first transistor is electrically connected to the first node;

a control electrode of the second transistor is electrically connected to the first scanning signal terminal, a first electrode of the second transistor is electrically connected to the first data signal terminal, and a second electrode of the second transistor is electrically connected to the third node;

a control electrode of the third transistor is electrically connected to the fourth scanning signal terminal, a first electrode of the third transistor is electrically connected to the first data signal terminal, and a second electrode of the third transistor is electrically connected to the third node;

a control electrode of the fifth transistor is electrically connected to the fourth node, a first electrode of the fifth transistor is electrically connected to the first node, and a second electrode of the fifth transistor is electrically connected to the second node;

a control electrode of the sixth transistor is electrically connected to the second scanning signal terminal, a first electrode of the sixth transistor is electrically connected to the second data signal terminal, and a second electrode of the sixth transistor is electrically connected to the fifth node;

a control electrode of the seventh transistor is electrically connected to the third scanning signal terminal, a first electrode of the seventh transistor is electrically connected to the first control signal terminal, and a second electrode of the seventh transistor is electrically connected to the fifth node;

a control electrode of the eighth transistor is electrically connected to the reset signal terminal, a first electrode of the eighth transistor is electrically connected to the first initial signal terminal, and a second electrode of the eighth transistor is electrically connected to the fourth node;

a control electrode of the ninth transistor is electrically connected to the reset signal terminal, a first electrode of the ninth transistor is electrically connected to the second initial signal terminal, and a second electrode of the ninth transistor is electrically connected to the fifth node;

one plate of the first capacitor is electrically connected to the third node, and the other plate of the first capacitor is electrically connected to the third power supply terminal or the first node;

one plate of the second capacitor is electrically connected to the fourth node, and the other plate of the second capacitor is electrically connected to the fifth node;

the first transistor, the second transistor, and the fifth transistor through ninth transistor are of the same type and are opposite to the type of the third transistor; and the first transistor, the second transistor, the third transistor, and the fifth transistor through ninth transistor are all metal oxide semiconductor transistors.

In some possible implementations, the driving circuit further includes a node control sub-circuit, the current control sub-circuit includes a first transistor, a second transistor and a first capacitor, the node control sub-circuit includes a fourth transistor, and the duration control sub-circuit includes fifth transistor through ninth transistor and a second capacitor;

a control electrode of the first transistor is electrically connected to the third node, a first electrode of the first transistor is electrically connected to the first power supply terminal, and a second electrode of the first transistor is electrically connected to the first node;

a control electrode of the second transistor is electrically connected to the first scanning signal terminal, a first electrode of the second transistor is electrically connected to the first data signal terminal, and a second electrode of the second transistor is electrically connected to the third node;

a control electrode of the fourth transistor is electrically connected to the fifth scanning signal terminal, a first electrode of the fourth transistor is electrically connected to the second control signal terminal, and a second electrode of the fourth transistor is electrically connected to the first node;

a control electrode of the fifth transistor is electrically connected to the fourth node, a first electrode of the fifth transistor is electrically connected to the first node, and a second electrode of the fifth transistor is electrically connected to the second node;

a control electrode of the sixth transistor is electrically connected to the second scanning signal terminal, a first electrode of the sixth transistor is electrically connected to the second data signal terminal, and a second electrode of the sixth transistor is electrically connected to the fifth node;

a control electrode of the seventh transistor is electrically connected to the third scanning signal terminal, a first electrode of the seventh transistor is electrically connected to the first control signal terminal, and a second electrode of the seventh transistor is electrically connected to the fifth node;

a control electrode of the eighth transistor is electrically connected to the reset signal terminal, a first electrode of the eighth transistor is electrically connected to the first initial signal terminal, and a second electrode of the eighth transistor is electrically connected to the fourth node;

a control electrode of the ninth transistor is electrically connected to the reset signal terminal, a first electrode of the ninth transistor is electrically connected to the second initial signal terminal, and a second electrode of the ninth transistor is electrically connected to the fifth node;

one plate of the first capacitor is electrically connected to the third node, and the other plate of the first capacitor is electrically connected to the third power supply terminal or the first node;

one plate of the second capacitor is electrically connected to the fourth node, and the other plate of the second capacitor is electrically connected to the fifth node; and the first transistor, the second transistor, and the fourth transistor through ninth transistor are of the same type and are all metal oxide semiconductor transistors.

In some possible implementations, the driving circuit further includes a node control sub-circuit, the current control sub-circuit includes a first transistor, a second transistor, a third transistor and a first capacitor, the node control sub-circuit includes a fourth transistor, and the duration control sub-circuit includes fifth transistor through ninth transistor and a second capacitor;

a control electrode of the first transistor is electrically connected to the third node, a first electrode of the first transistor is electrically connected to the first power supply terminal, and a second electrode of the first transistor is electrically connected to the first node;

a control electrode of the second transistor is electrically connected to the first scanning signal terminal, a first electrode of the second transistor is electrically connected to the first data signal terminal, and a second electrode of the second transistor is electrically connected to the third node;

a control electrode of the third transistor is electrically connected to the fourth scanning signal terminal, a first electrode of the third transistor is electrically connected to the first data signal terminal, and a second electrode of the third transistor is electrically connected to the third node;

a control electrode of the fourth transistor is electrically connected to the fifth scanning signal terminal, a first electrode of the fourth transistor is electrically connected to the second control signal terminal, and a second electrode of the fourth transistor is electrically connected to the first node;

a control electrode of the fifth transistor is electrically connected to the fourth node, a first electrode of the fifth transistor is electrically connected to the first node, and a second electrode of the fifth transistor is electrically connected to the second node;

a control electrode of the sixth transistor is electrically connected to the second scanning signal terminal, a first electrode of the sixth transistor is electrically connected to the second data signal terminal, and a second electrode of the sixth transistor is electrically connected to the fifth node;

a control electrode of the seventh transistor is electrically connected to the third scanning signal terminal, a first electrode of the seventh transistor is electrically connected to the first control signal terminal, and a second electrode of the seventh transistor is electrically connected to the fifth node;

a control electrode of the eighth transistor is electrically connected to the reset signal terminal, a first electrode of the eighth transistor is electrically connected to the first initial signal terminal, and a second electrode of the eighth transistor is electrically connected to the fourth node;

a control electrode of the ninth transistor is electrically connected to the reset signal terminal, a first electrode of the ninth transistor is electrically connected to the second initial signal terminal, and a second electrode of the ninth transistor is electrically connected to the fifth node;

one plate of the first capacitor is electrically connected to the third node, and the other plate of the first capacitor is electrically connected to the third power supply terminal or the first node;

one plate of the second capacitor is electrically connected to the fourth node, and the other plate of the second capacitor is electrically connected to the fifth node;

the first transistor, the second transistor, and the fourth transistor through ninth transistor are of the same type and are opposite to the type of the third transistor; and the first transistor through ninth transistor are all metal oxide semiconductor transistors.

In some possible implementations, the light-emitting element includes a micro light-emitting diode or a mini light-emitting diode.

In a second aspect, the present invention further provides a display substrate including a display area and a non-display area surrounding at least one side of the display area, a plurality of pixels being disposed in the display area, and the aforementioned pixel circuit being disposed within each of the pixels.

In some possible implementations, when the pixel circuit includes the node control sub-circuit, the display substrate further includes a first chip connected to a second control signal terminal and a second chip connected to a first data signal terminal;

the first chip is configured to provide a signal to the second control signal terminal in a display stage and read the signal passing through the second control signal terminal in a non-display stage, and is further configured to obtain a threshold voltage of a first transistor according to the signal of the second control signal terminal, generate a control signal according to the threshold voltage of the first transistor, and send the control signal to the second chip; and the second chip provides a signal to the first data signal terminal according to the control signal.

In a third aspect, the present disclosure further provides a display device including the display substrate described above.

In a fourth aspect, the present disclosure further provides a driving method for a pixel circuit, which is used for driving the pixel circuit, the pixel circuit being located in a display substrate, a display stage and a non-display stage are configured for the display substrate, and the method including:

a current control sub-circuit provides a driving current to a first node under the control of a first scanning signal terminal, a first data signal terminal and a first power supply terminal in the display stage and the non-display stage; and a duration control sub-circuit provides a signal of the first node to a second node under the control of a second scanning signal terminal, a third scanning signal terminal, a second data signal terminal, a first control signal terminal, a reset signal terminal, a first initial signal terminal and a second initial signal terminal in the display stage.

In some possible implementations, the pixel circuit further includes a node control sub-circuit, the method further including:

the node control sub-circuit provides a signal of a second control signal terminal to the first node under the control of a fifth scanning signal terminal in the display stage; and the node control sub-circuit reads the signal of the first node to the second control signal terminal under the control of the fifth scanning signal terminal in the non-display stage.

Other aspects may become clear after the accompanying drawings and the detailed description are read and understood.

BRIEF DESCRIPTION OF DRAWINGS

The accompanying drawings are intended to provide an understanding of technical schemes of the present disclosure and form a part of the specification, and are used to explain the technical schemes of the present disclosure together with examples of the present disclosure, and not intended to form limitations to the technical schemes of the present disclosure.

DETAILED DESCRIPTION

Figure 1:
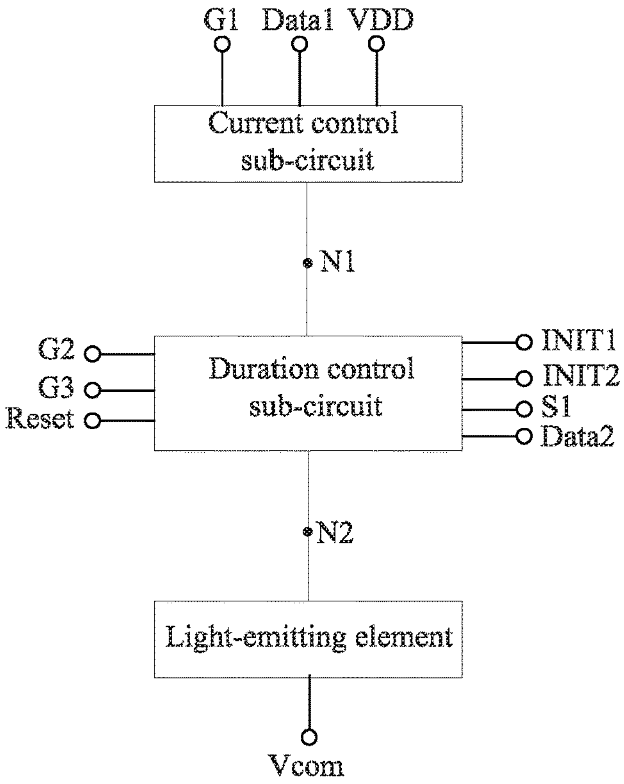
FIG. 1 is a schematic structure diagram of a pixel circuit in accordance with an embodiment of the present disclosure.

In order to make objects, technical schemes and advantages of the present disclosure more clear, embodiments of the present disclosure will be described below in detail in combination with the drawings. It should be noted that implementations may be implemented in a number of different forms. Those of ordinary skills in the art may readily understand the fact that implementations and contents may be transformed into various forms without departing from the purpose and scope of the present disclosure. Therefore, the present disclosure should not be interpreted as being limited to the contents recorded in following implementations only. The embodiments in the present disclosure and features in the embodiments can be arbitrarily combined with each other if there are no conflicts. In order to keep the following description of the embodiments of the present disclosure clear and concise, detailed descriptions of a portion of known functions and known components are omitted in the present disclosure. The accompanying drawings of the present disclosure relate only to the structures involved in the embodiments of the present disclosure, and other structures may be understood with reference to conventional designs.

Sometimes for the sake of clarity, the sizes of various constituent elements, the thicknesses of layers or regions in the drawings may be exaggerated. Therefore, one implementation of the present disclosure is not necessarily limited to the sizes, and the shapes and sizes of various components in the drawings do not reflect the true proportion. In addition, the drawings schematically illustrate ideal examples, and one implementation of the present disclosure is not limited to the shapes or numerical values shown in the drawings.

Ordinal numerals such as “first”, “second”, “third” and the like in the specification are set to avoid confusion of the constituent elements, but not to set a limit in quantity.

For the sake of convenience, the terms such as “middle”, “upper”, “lower”, “front”, “back”, “vertical”, “horizontal”, “top”, “bottom”, “inside”, “outside” and the like indicating orientation or position relationships are used in the specification to illustrate position relationships between the constituent elements with reference to the drawings, and are intended to facilitate description of the specification and simplify the description, but not to indicate or imply that the mentioned device or element must have a specific orientation or be constructed and operated in a specific orientation, therefore, they should not be understood as limitations to the present disclosure. The position relationships between the constituent elements are appropriately changed according to directions of the constituent elements described. Therefore, words and phrases used in the specification are not limited and appropriate substitutions may be made according to situations.

Unless otherwise specified and defined explicitly, the terms “installed”, “coupled” and “connected” should be understood in a broad sense in the specification. For example, the connection may be a fixed connection, a detachable connection or an integrated connection, or may be a mechanical connection or an electrical connection, or may be a direct connection, an indirect connection through intermediate components, or communication inside two components. For those skilled in the art, the specific meanings of the above terms in the present disclosure can be understood according to the specific situations.

In the specification, a transistor refers to a component which at least includes three terminals, a gate electrode, a drain electrode and a source electrode. The transistor has a channel region between the drain electrode (drain electrode terminal, drain region or drain) and the source electrode (source electrode terminal, source region or source), and a current can flow through the drain electrode, the channel region and the source electrode. In the specification, the channel region refers to a region which the current flows mainly through.

In the specification, the first electrode may be a drain electrode and the second electrode may be a source electrode, or the first electrode may be a source electrode and the second electrode may be a drain electrode. In the case that transistors with opposite polarities are used or the case that a current direction is changed during circuit operation, functions of the “source electrode” and the “drain electrode” are sometimes interchangeable. Therefore, the “source electrode” and the “drain electrode” can be interchanged in the specification.

In the specification, “electrical connection” includes a case where the constituent elements are connected together through an element with a certain electrical effect. The “element with the certain electrical effect” is not particularly limited as long as electrical signals can be sent and received between the connected constituent elements. Examples of the “element with the certain electrical action” not only include an electrode and a wiring, but also include a switching element such as a transistor, a resistor, an inductor, a capacitor, other elements with one or more functions, etc.

In the specification, “parallel” refers to a state in which an angle formed by two straight lines is greater than −10° and less than 10°, and thus also includes a state in which the angle is greater than −5° and less than 5°. In addition, “vertical” refers to a state in which an angle formed by two straight lines is greater than 800 and less than 100°, and thus also includes a state in which the angle is greater than 850 and less than 95°.

In the specification, “film” and “layer” may be interchangeable. For example, sometimes “conducting layer” may be replaced by “conducting film”. Similarly, sometimes “insulating film” may be replaced by “insulating layer”.

“About” in the present disclosure means that a boundary is defined loosely and numerical values within process and measurement error ranges are allowed.

Due to the non-uniformity of manufacturing processes of light-emitting diode elements, light-up voltages of different light-emitting diode elements are inconsistent. In addition, the electro-optical conversion characteristics (including efficiency, uniformity, color coordinates, etc.) of self-light-emitting elements are changed with the current, so that the display of display products including the light-emitting diode elements is non-uniform, thereby decreasing the display effect of the display products.

FIG. 1 is a schematic structure diagram of a pixel circuit in accordance with an embodiment of the present disclosure. As shown in FIG. 1, the pixel circuit in accordance with the embodiment of the present disclosure includes a driving circuit and a light-emitting element connected in series between a first power supply terminal VDD and a second power supply terminal VSS; the driving circuit is configured to provide a driving current and control a conducting duration of a current pathway between the first power supply terminal VDD and the second power supply terminal Vcom; the light-emitting element is configured to receive the driving current in the current pathway and emit light. As shown in FIG. 1, the driving circuit may include a current control sub-circuit and a duration control sub-circuit.

As shown in FIG. 1, the current control sub-circuit, electrically connected to a first scanning signal terminal G1, a first data signal terminal Data1, a first power supply terminal VDD and a first node N1, respectively, is configured to provide a driving current to the first node N1 under the control of the first scanning signal terminal G1, the first data signal terminal Data1 and the first power supply terminal VDD. The duration control sub-circuit, electrically connected to a second scanning signal terminal G2, a third scanning signal terminal G3, a second data signal terminal Data2, a first control signal terminal S1, a reset signal terminal Reset, a first initial signal terminal INIT1 and a second initial signal terminal INIT2, the first node N1 and a second node N2, respectively, is configured to provide a signal of the first node N1 to the second node N2 under the control of the second scanning signal terminal G2, the third scanning signal terminal G3, the second data signal terminal Data2, the first control signal terminal S1, the reset signal terminal Reset, the first initial signal terminal INIT1 and the second initial signal terminal INIT2.

As shown in FIG. 1, the light-emitting element is electrically connected to the second node N2 and a second power supply terminal Vcom, respectively.

In an exemplary embodiment, the first power supply terminal VDD continuously provides high-level signals, and the second power supply terminal Vcom continuously provides low-level signals.

In an exemplary embodiment, a voltage value of a signal of the second power supply terminal Vcom may be a negative voltage value.

In an exemplary embodiment, the light-emitting element includes a first electrode and a second electrode. Illustratively, the first electrode of the light-emitting element is electrically connected to the second node N2, and the second electrode of the light-emitting element is electrically connected to the second power supply terminal Vcom.

In an exemplary embodiment, the light-emitting element may be a micro light-emitting diode or a mini light-emitting diode. The typical size (e.g., length) of the micro light-emitting diode may be less than 80 μm, e.g., 10 μm to 50 μm, and it does not contain a growth substrate (e.g., sapphire). The typical size (e.g., length) of the mini light-emitting diode may be about 80 μm to 350 μm, e.g., 100 μm to 220 μm.

In an exemplary embodiment, the pixel circuit in the present disclosure may be disposed on a silicon-based substrate. The pixel circuit in the present disclosure disposed on the silicon-based substrate may improve the electrical stability of the pixel circuit. Because the electrical stability of the pixel circuit disposed on the silicon-based substrate is good, thus no internal compensation circuit needs to be provided in the driving circuit in the pixel circuit disposed on the silicon-based substrate, so as to reduce the area occupied by the driving circuit, improve the PPI of a display product where the pixel circuit is located, prevent occurrence of the screen-door effect, and improve the display effect of the display product where the pixel circuit is located.

In an exemplary embodiment, when a signal of the reset signal terminal Reset is an active level signal, signals of the first scanning signal terminal G1, the second scanning signal terminal G2 and the third scanning signal terminal G3 are inactive level signals.

In an exemplary embodiment, when the signal of the first scanning signal terminal G1 is an active level signal, the signal of the second scanning signal terminal G2 is an active level signal, and the signals of the reset signal terminal Reset and the third scanning signal terminal G3 are inactive level signals.

In an exemplary embodiment, when the signal of the third scanning signal terminal G3 is an active level signal, the signals of the reset signal terminal Reset, the second scanning signal terminal G2 and the third scanning signal terminal G3 are inactive level signals.

In an exemplary embodiment, a signal of the first control signal terminal S1 is a ramp signal.

In an exemplary embodiment, a voltage value of a signal of the first initial signal terminal INIT1 is constant and the signal is a DC signal. The voltage value of the signal of the first initial signal terminal INIT1 may be 3V.

In an exemplary embodiment, a voltage value of a signal of the second initial signal terminal INIT2 is constant and the signal is a DC signal. The voltage value of the signal of the second initial signal terminal INIT2 may be 0V.

The pixel circuit in accordance with the embodiment of the present disclosure includes a driving circuit and a light-emitting element connected in series between a first power supply terminal and a second power supply terminal; the driving circuit is configured to provide a driving current and control a conducting duration of a current pathway between the first power supply terminal and the second power supply terminal; the light-emitting element is configured to receive the driving current in the current pathway and emit light; the driving circuit includes a current control sub-circuit and a duration control sub-circuit; the current control sub-circuit, electrically connected to a first scanning signal terminal, a first data signal terminal, a first power supply terminal and a first node, respectively, is configured to provide a driving current to the first node under the control of the first scanning signal terminal, the first data signal terminal and the first power supply terminal; the duration control sub-circuit, electrically connected to a second scanning signal terminal, a third scanning signal terminal, a second data signal terminal, a first control signal terminal, a reset signal terminal, a first initial signal terminal and a second initial signal terminal, the first node and a second node, respectively, is configured to provide a signal of the first node to the second node under the control of the second scanning signal terminal, the third scanning signal terminal, the second data signal terminal, the first control signal terminal, the reset signal terminal, the first initial signal terminal and the second initial signal terminal; and the light-emitting element is electrically connected to the second node and a second power supply terminal, respectively. In the present invention, the current control sub-circuit and the duration control sub-circuit are configured such that the light-emitting time of the light-emitting element can be controlled, to ensure the light-emitting stability of the light-emitting element at low gray scale and improve the display effect of the display product.

Figure 2:
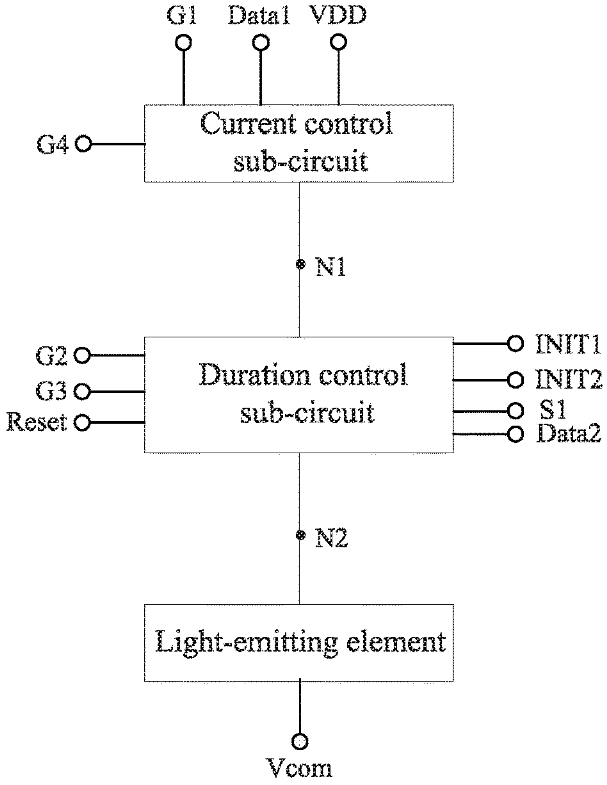
FIG. 2 is a schematic structure diagram of a pixel circuit in accordance with an exemplary embodiment.

FIG. 2 is a schematic structure diagram of a pixel circuit in accordance with an exemplary embodiment. As shown in FIG. 2, in an exemplary embodiment, the current control sub-circuit, also electrically connected to a fourth scanning signal terminal G4, is configured to provide a driving current to the first node N1 under the control of the first scanning signal terminal G1, the fourth scanning signal terminal G4, the first data signal terminal Data1 and the first power supply terminal VDD.

In an exemplary embodiment, when the signal of the first scanning signal terminal G1 is an active level signal, a signal of the fourth scanning signal terminal G4 is an active level signal.

Figure 3:
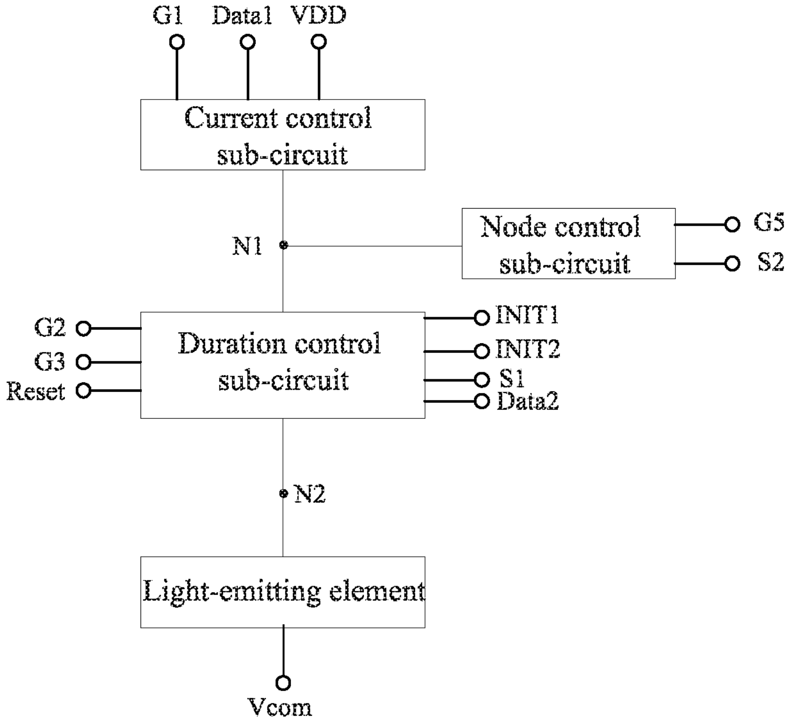
FIG. 3 is a schematic structure diagram of a pixel circuit in accordance with another exemplary embodiment.
Figure 4:
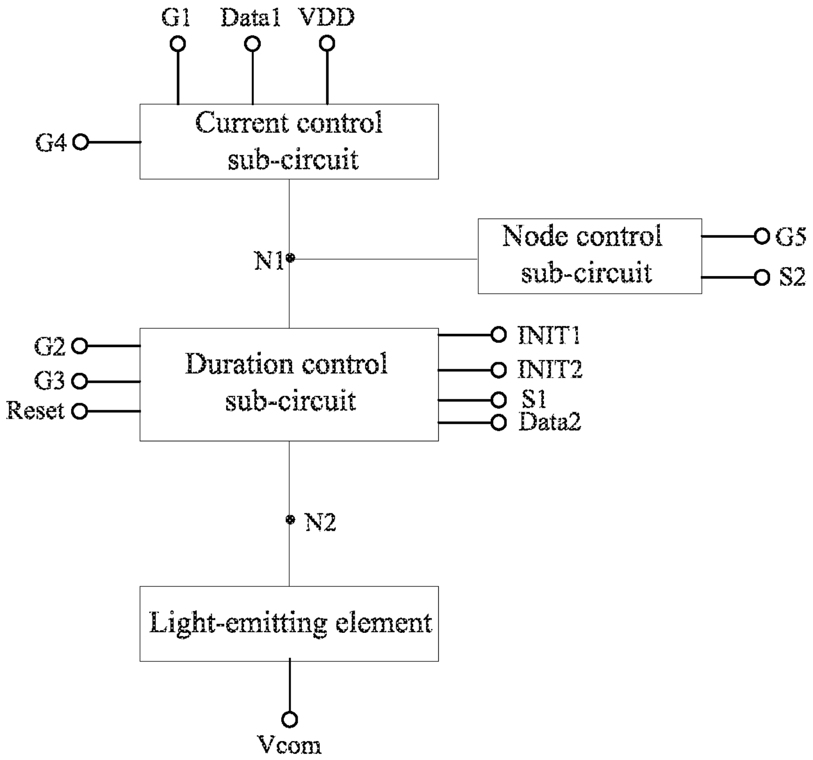
FIG. 4 is a schematic structure diagram of a pixel circuit in accordance with yet another exemplary embodiment.

FIG. 3 is a schematic structure diagram of a pixel circuit in accordance with another exemplary embodiment and FIG. 4 is a schematic structure diagram of a pixel circuit in accordance with yet another exemplary embodiment. As shown in FIGS. 3 and 4, in an exemplary embodiment, the driving circuit can further include a node control sub-circuit. FIG. 3 is illustrated by taking the current control sub-circuit being electrically connected to the first scanning signal terminal G1 as an example, and FIG. 4 is illustrated by taking the current control sub-circuit being electrically connected to the first scanning signal terminal G1 and the fourth scanning signal terminal G4 as an example.

As shown in FIGS. 3 and 4, the node control sub-circuit, electrically connected to a fifth scanning signal terminal G5, a second control signal terminal S2 and the first node N1, respectively, is configured to provide a signal of the second control signal terminal S2 to the first node N1 or read the signal of the first node N1 to the second control signal terminal S2 under the control of the fifth scanning signal terminal G5.

In an exemplary embodiment, a voltage value of the signal of the second control signal terminal S2 is constant.

In the present invention, the node control sub-circuit is configured such that a signal of the first data signal terminal can be compensated externally according to the signal of the first node N1, to improve the display effect of the display product.

In an exemplary embodiment, when the signal of the first scanning signal terminal G1 is an active level signal, a signal of the fifth scanning signal terminal G5 is an active level signal.

In an exemplary embodiment, the current control sub-circuit may be electrically connected to a third power supply terminal VSS.

In an exemplary embodiment, the third power supply terminal VSS continuously provides low-level signals, and a voltage value of a signal of the third power supply terminal VSS may be 0V.

Figure 5A:
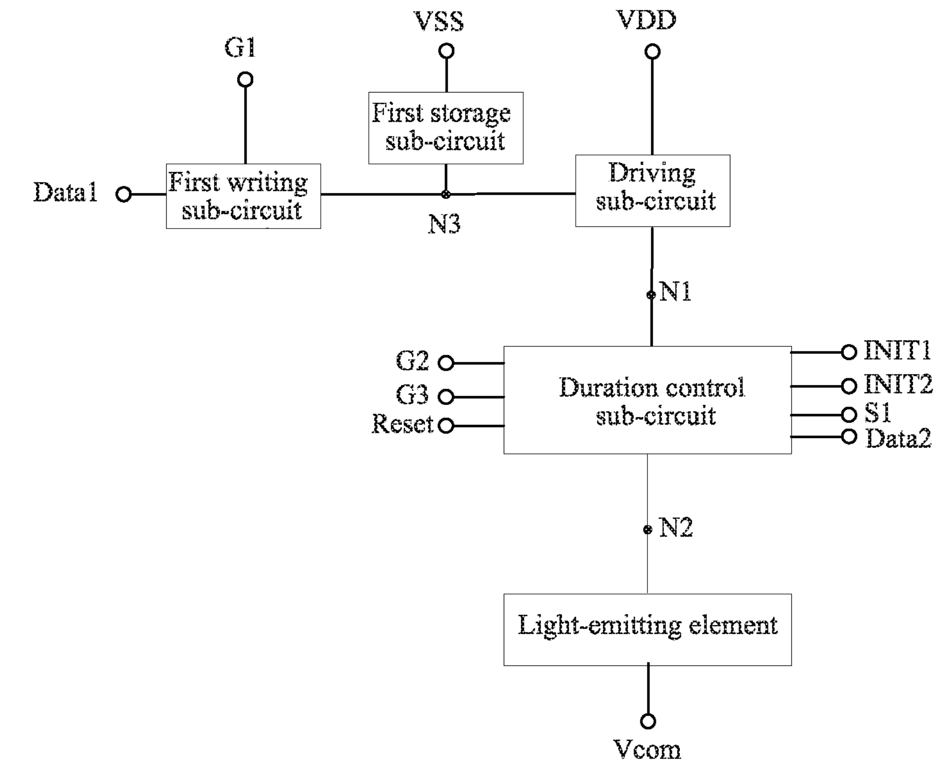
FIG. 5A is a schematic structure diagram I of a current control sub-circuit in accordance with an exemplary embodiment.
Figure 5B:
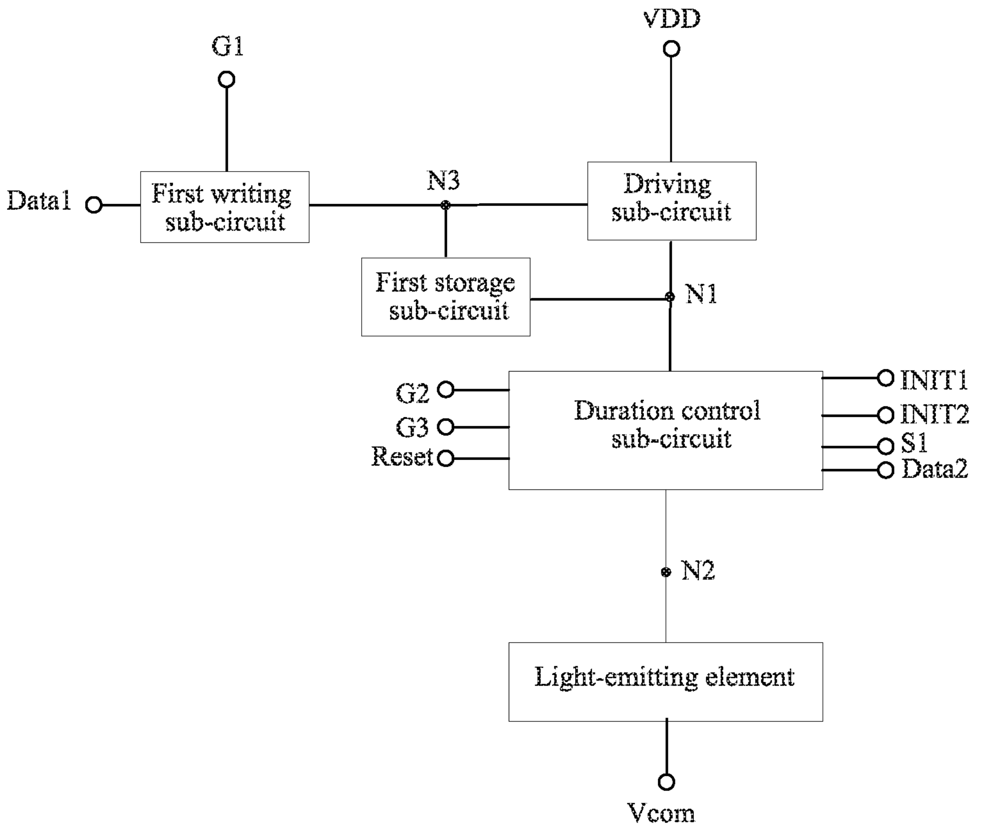
FIG. 5B is a schematic structure diagram II of a current control sub-circuit in accordance with an exemplary embodiment.

FIG. 5A is a schematic structure diagram I of a current control sub-circuit in accordance with an exemplary embodiment, and FIG. 5B is a schematic structure diagram II of a current control sub-circuit in accordance with an exemplary embodiment. As shown in FIGS. 5A and 5B, in an exemplary embodiment, the current control sub-circuit may include a first writing sub-circuit, a first storage sub-circuit and a driving sub-circuit.

As shown in FIGS. 5A and 5B, the first writing sub-circuit, electrically connected to the first scanning signal terminal G1, the first data signal terminal Data1 and a third node N3, respectively, is configured to provide a signal of the first data signal terminal Data1 to the third node N3 under the control of the first scanning signal terminal G1; the first storage sub-circuit, electrically connected to the third node N3 and a third power supply terminal VSS, respectively, is configured to store a voltage difference between signals of the third node N3 and the third power supply terminal VSS, or electrically connected to the first node N1 and the third node N3, respectively, is configured to store a voltage difference between the signals of the first node N1 and the third node N3; the driving sub-circuit, electrically connected to the first power supply terminal VDD, the first node N1 and the third node N3, respectively, is configured to provide a driving current to the first node N1 under the control of the third node N3 and the first power supply terminal VDD. FIG. 5A is illustrated by taking the first storage sub-circuit being electrically connected to the third node N3 and the third power supply terminal VSS respectively as an example, and FIG. 5B is illustrated by taking the first storage sub-circuit being electrically connected to the first node N1 and the third node N3 respectively as an example.

Figure 6A:
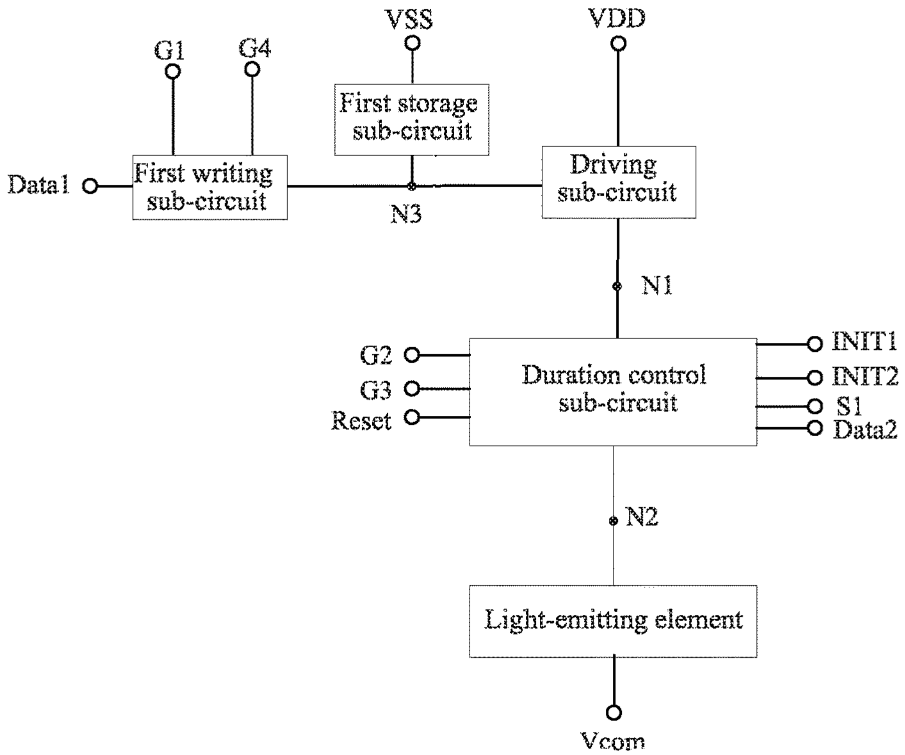
FIG. 6A is a schematic structure diagram I of a current control sub-circuit in accordance with another exemplary embodiment.
Figure 6B:
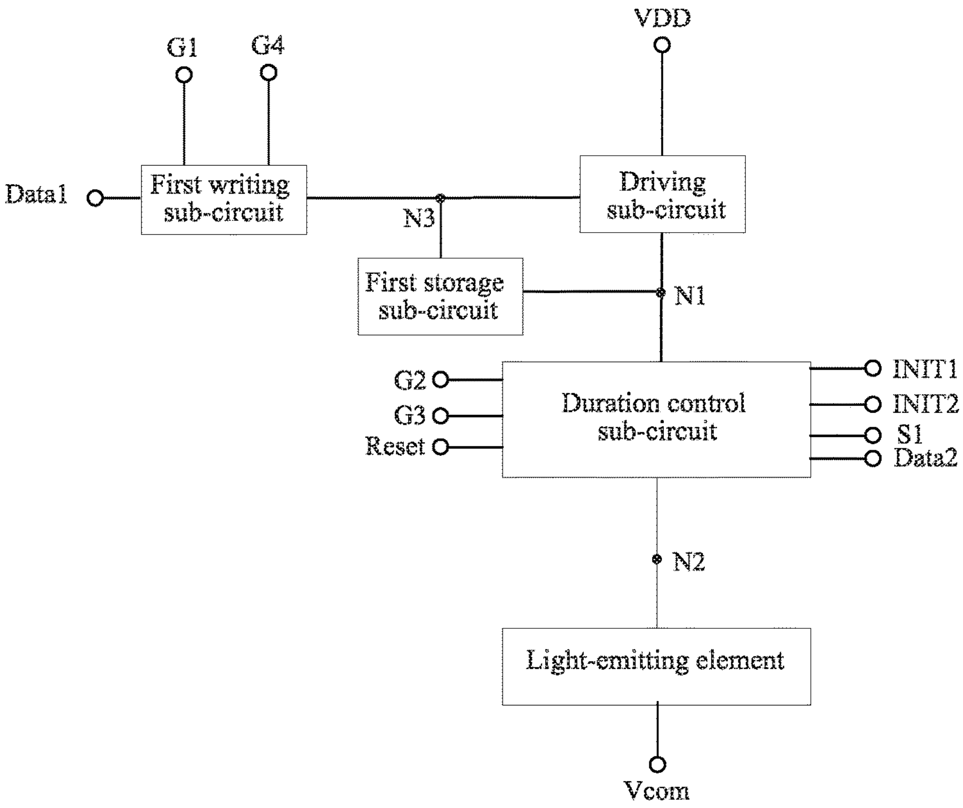
FIG. 6B is a schematic structure diagram II of a current control sub-circuit in accordance with another exemplary embodiment.

FIG. 6A is a schematic structure diagram I of a current control sub-circuit in accordance with another exemplary embodiment, and FIG. 6B is a schematic structure diagram II of a current control sub-circuit in accordance with another exemplary embodiment. As shown in FIGS. 6A and 6B, in an exemplary embodiment, the current control sub-circuit may include a first writing sub-circuit, a first storage sub-circuit and a driving sub-circuit.

As shown in FIGS. 6A and 6B, the first writing sub-circuit, electrically connected to the first scanning signal terminal G1, the fourth scanning signal terminal G4, the first data signal terminal Data1 and a third node N3, respectively, is configured to provide a signal of the first data signal terminal Data1 to the third node N3 under the control of the first scanning signal terminal G1 and the fourth scanning signal terminal G4; the first storage sub-circuit, electrically connected to the third node N3 and a third power supply terminal VSS, respectively, is configured to store a voltage difference between signals of the third node N3 and the third power supply terminal VSS, or electrically connected to the first node N1 and the third node N3, respectively, is configured to store a voltage difference between the signals of the first node N1 and the third node N3; the driving sub-circuit, electrically connected to the first power supply terminal VDD, the first node N1 and the third node N3, respectively, is configured to provide a driving current to the first node N1 under the control of the third node N3 and the first power supply terminal VDD. FIG. 6A is illustrated by taking the first storage sub-circuit being electrically connected to the third node N3 and the third power supply terminal VSS respectively as an example, and FIG. 6B is illustrated by taking the first storage sub-circuit being electrically connected to the first node N1 and the third node N3 respectively as an example.

Figure 7A:
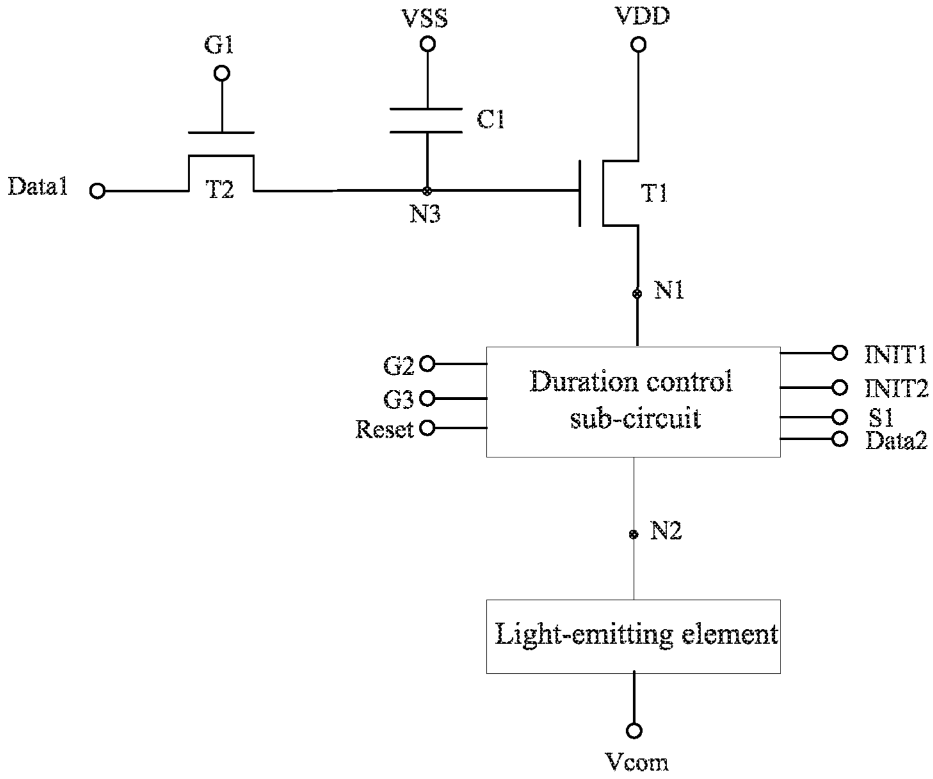
FIG. 7A is an equivalent circuit diagram I of a current control sub-circuit in accordance with an exemplary embodiment.
Figure 7B:
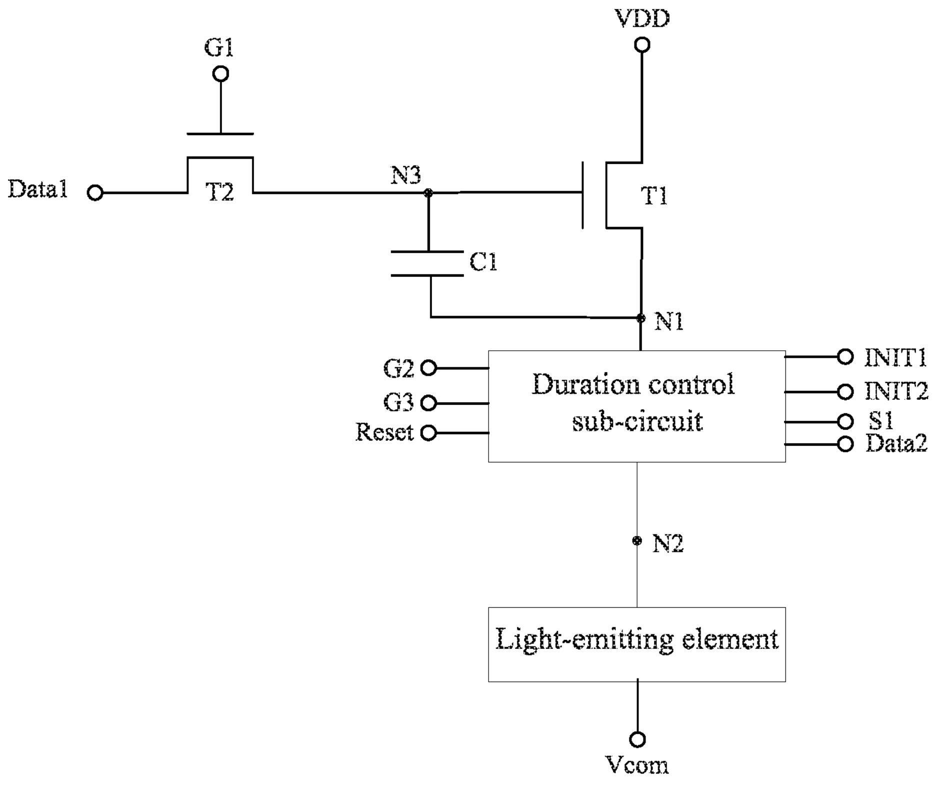
FIG. 7B is an equivalent circuit diagram II of a current control sub-circuit in accordance with an exemplary embodiment.
Figure 8A:
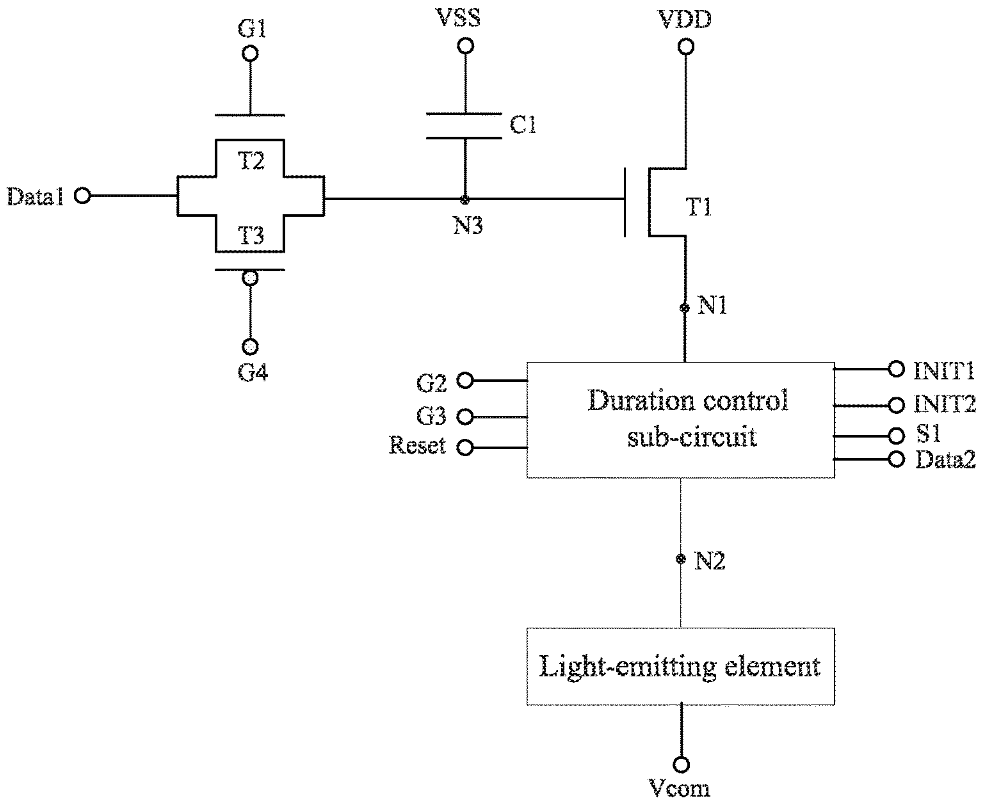
FIG. 8A is an equivalent circuit diagram I of a current control sub-circuit in accordance with another exemplary embodiment.
Figure 8B:
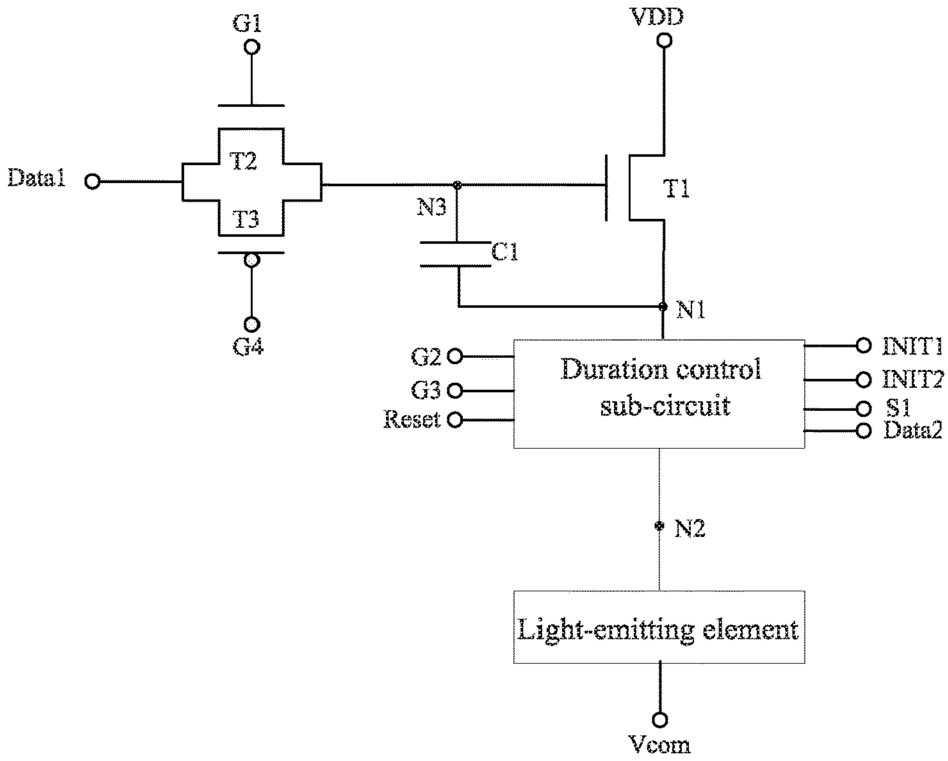
FIG. 8B is an equivalent circuit diagram II of a current control sub-circuit in accordance with another exemplary embodiment.

FIG. 7A is an equivalent circuit diagram I of a current control sub-circuit in accordance with an exemplary embodiment, FIG. 7B is an equivalent circuit diagram II of a current control sub-circuit in accordance with an exemplary embodiment, FIG. 8A is an equivalent circuit diagram I of a current control sub-circuit in accordance with another exemplary embodiment, and FIG. 8B is an equivalent circuit diagram II of a current control sub-circuit in accordance with another exemplary embodiment. As shown in FIGS. 7A, 7B, 8A and 8B, in an exemplary embodiment, the first storage sub-circuit may include a first capacitor C1, and the driving sub-circuit may include a first transistor T1. A control electrode of the first transistor T1 is electrically connected to the third node N3, a first electrode of the first transistor T1 is electrically connected to the first power supply terminal VDD, and a second electrode of the first transistor T1 is electrically connected to the first node N1; one plate of the first capacitor C1 is electrically connected to the third node N3, and the other plate of the first capacitor C1 is electrically connected to the third power supply terminal VSS or the first node N1. FIGS. 7A and 8A are illustrated by taking the other plate of the first capacitor C1 being electrically connected to the third power supply terminal VSS as an example, and FIGS. 7B and 8B are illustrated by taking the other plate of the first capacitor C1 being electrically connected to the first node N1 as an example.

An exemplary structure of the first storage sub-circuit and the driving sub-circuit is shown in FIGS. 7A, 7B, 8A, and 8B. It is easily understood by those skilled in the art that implementations of the first storage sub-circuit and the driving sub-circuit are not limited thereto.

In an exemplary embodiment, as shown in FIGS. 7A and 7B, the first writing sub-circuit may include a second transistor T2. A control electrode of the second transistor T2 is electrically connected to the first scanning signal terminal G1, a first electrode of the second transistor T2 is electrically connected to the first data signal terminal Data1, and a second electrode of the second transistor T2 is electrically connected to the third node N3.

An exemplary structure of the first writing sub-circuit is shown in FIGS. 7A and 7B. It is easily understood by those skilled in the art that implementations of the first writing sub-circuit are not limited thereto.

In an exemplary embodiment, as shown in FIGS. 8A and 8B, the first writing sub-circuit may include a second transistor T2 and a third transistor T3. A control electrode of the second transistor T2 is electrically connected to the first scanning signal terminal G1, a first electrode of the second transistor T2 is electrically connected to the first data signal terminal Data1, and a second electrode of the second transistor T2 is electrically connected to the third node N3; a control electrode of the third transistor T3 is electrically connected to the fourth scanning signal terminal G4, a first electrode of the third transistor T3 is electrically connected to the first data signal terminal Data1, and a second electrode of the third transistor T3 is electrically connected to the third node N3.

In the present disclosure, the second transistor T2 and the third transistor T3, which are equivalent to transmission gates, can increase the writing range of data signals of the first data signal terminal Data1 and improve the reliability of the pixel circuit.

Another exemplary structure of the first writing sub-circuit is shown in FIGS. 8A and 8B. It is easily understood by those skilled in the art that implementations of the first writing sub-circuit are not limited thereto.

In an exemplary embodiment, the second transistor T2 and the third transistor T3 are of different types.

Figure 9:
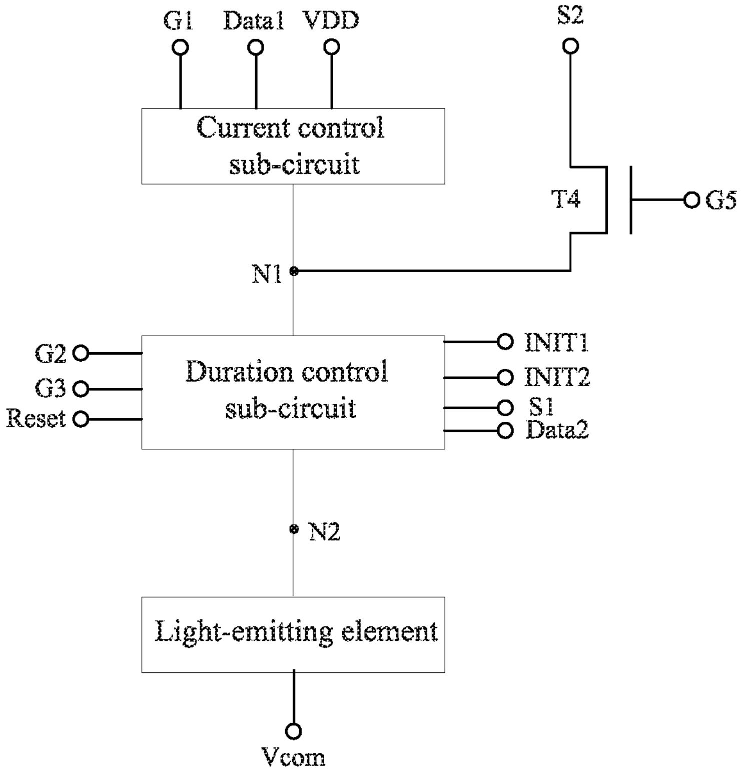
FIG. 9 is an equivalent circuit diagram of a node control sub-circuit in accordance with an exemplary embodiment.

FIG. 9 is an equivalent circuit diagram of a node control sub-circuit in accordance with an exemplary embodiment. As shown in FIG. 9, in an exemplary embodiment, the node control sub-circuit may include a fourth transistor T4. FIG. 9 is illustrated by taking the current control sub-circuit being electrically connected to the first scanning signal terminal G1 as an example.

As shown in FIG. 9, a control electrode of the fourth transistor T4 is electrically connected to the fifth scanning signal terminal G5, a first electrode of the fourth transistor T4 is electrically connected to the second control signal terminal S2, and a second electrode of the fourth transistor T4 is electrically connected to the first node N1.

An exemplary structure of the node control sub-circuit is shown in FIG. 9. It is easily understood by those skilled in the art that implementations of the node control sub-circuit are not limited thereto.

Figure 10:
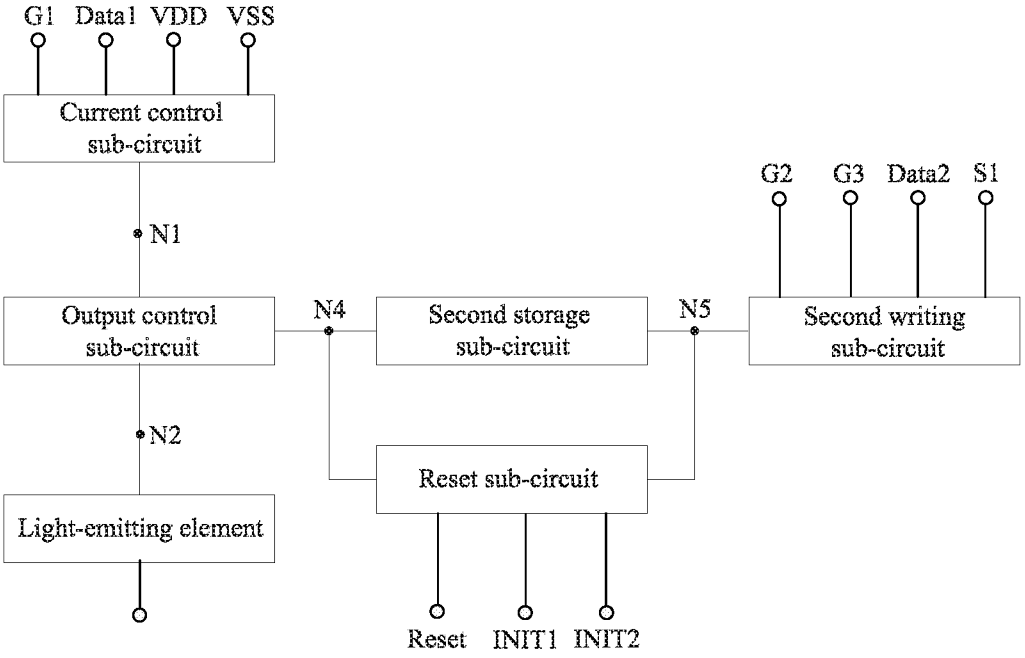
FIG. 10 is a structural circuit diagram of a duration control sub-circuit in accordance with an exemplary embodiment.

FIG. 10 is a structural circuit diagram of a duration control sub-circuit in accordance with an exemplary embodiment. As shown in FIG. 10, in an exemplary embodiment, the duration control sub-circuit may include a second writing sub-circuit, a second storage sub-circuit, a reset sub-circuit and an output control sub-circuit.

As shown in FIG. 10, the second storage sub-circuit, electrically connected to a fourth node N4 and a fifth node N5, respectively, is configured to store a voltage difference between signals of the fourth node N4 and the fifth node N5; the second writing sub-circuit, electrically connected to the second scanning signal terminal G2, the third scanning signal terminal G3, the second data signal terminal Data2, the first control signal terminal S1 and the fifth node N5, respectively, is configured to provide a signal of the second data signal terminal Data2 to the fifth node N5 under the control of the second scanning signal terminal G2, and provide the signal of the first control signal terminal S1 to the fifth node N5 under the control of the third scanning signal terminal G3; the reset sub-circuit, electrically connected to the reset signal terminal Reset, the first initial signal terminal INIT1, the second initial signal terminal INIT2, the fourth node N4 and the fifth node N5, respectively, is configured to provide the signal of the first initial signal terminal INIT1 to the fourth node N4 and provide the signal of the second initial signal terminal INIT2 to the fifth node N5 under the control of the reset signal terminal Reset; the output control sub-circuit, electrically connected to the first node N1, the second node N2 and the fourth node N4, respectively, is configured to provide the signal of the first node N1 to the second node N2 under the control of the fourth node N4.

Figure 11:
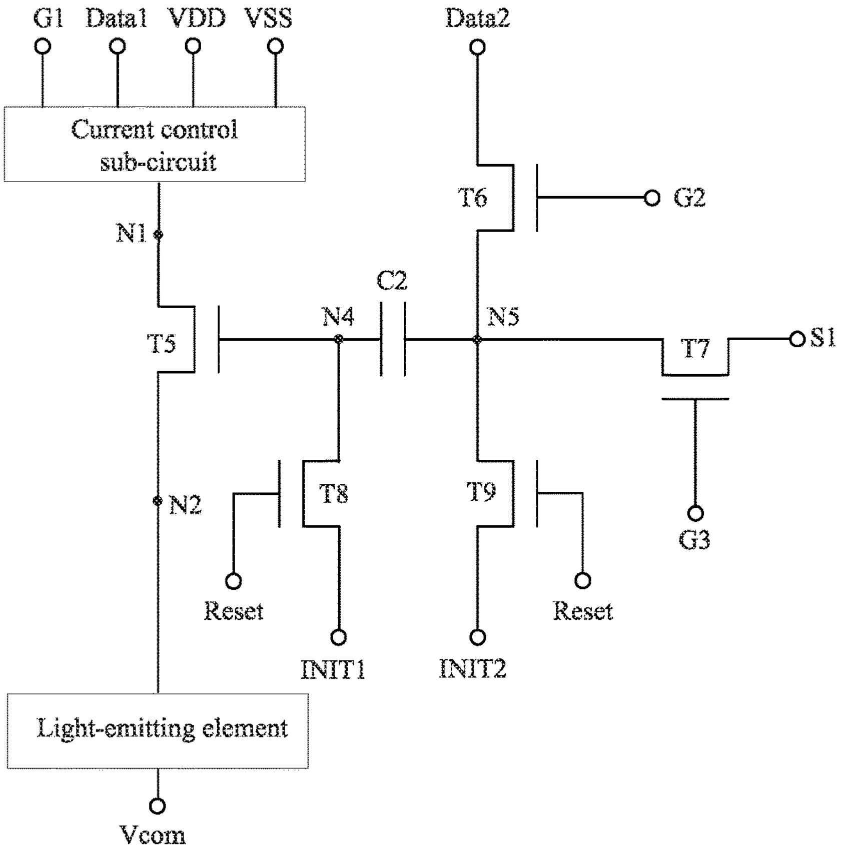
FIG. 11 is an equivalent circuit diagram of a duration control sub-circuit in accordance with an exemplary embodiment.

FIG. 11 is an equivalent circuit diagram of a duration control sub-circuit in accordance with an exemplary embodiment. As shown in FIG. 11, in an exemplary embodiment, the output control sub-circuit may include a fifth transistor T5, and the second storage sub-circuit may include a second capacitor C2. A control electrode of the fifth transistor T5 is electrically connected to the fourth node N4, a first electrode of the fifth transistor T5 is electrically connected to the first node N1, and a second electrode of the fifth transistor T5 is electrically connected to the second node N2; one plate of the second capacitor C2 is electrically connected to the fourth node N4, and the other plate of the second capacitor C2 is electrically connected to the fifth node N5.

As shown in FIG. 11, in an exemplary embodiment, the second writing sub-circuit may include a sixth transistor T6 and a seventh transistor T7. A control electrode of the sixth transistor T6 is electrically connected to the second scanning signal terminal G2, a first electrode of the sixth transistor T6 is electrically connected to the second data signal terminal Data2, and a second electrode of the sixth transistor T6 is electrically connected to the fifth node N5; a control electrode of the seventh transistor T7 is electrically connected to the third scanning signal terminal G3, a first electrode of the seventh transistor T7 is electrically connected to the first control signal terminal S1, and a second electrode of the seventh transistor T7 is electrically connected to the fifth node N5.

As shown in FIG. 11, in an exemplary embodiment, the reset sub-circuit may include an eighth transistor T8 and a ninth transistor T9. A control electrode of the eighth transistor T8 is electrically connected to the reset signal terminal Reset, a first electrode of the eighth transistor T8 is electrically connected to the first initial signal terminal INIT1, and a second electrode of the eighth transistor T8 is electrically connected to the fourth node N4; a control electrode of the ninth transistor T9 is electrically connected to the reset signal terminal Reset, a first electrode of the ninth transistor T9 is electrically connected to the second initial signal terminal INIT2, and a second electrode of the ninth transistor T9 is electrically connected to the fifth node N5.

An exemplary structure of the second writing sub-circuit, the second storage sub-circuit, the reset sub-circuit and the output control sub-circuit is shown in FIG. 11. It is easily understood by those skilled in the art that implementations of the second writing sub-circuit, the second storage sub-circuit, the reset sub-circuit and the output control sub-circuit are not limited thereto.

Figure 12:
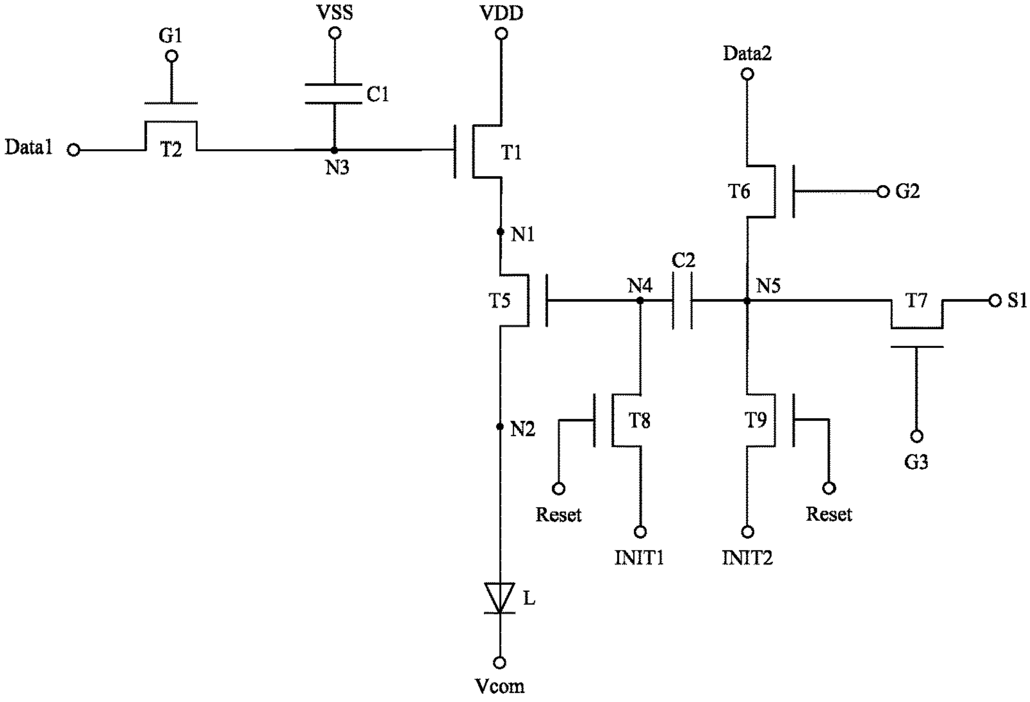
FIG. 12 is an equivalent circuit diagram I of a pixel circuit in accordance with an exemplary embodiment.

FIG. 12 is an equivalent circuit diagram I of a pixel circuit in accordance with an exemplary embodiment. As shown in FIG. 12, in an exemplary embodiment, the current control sub-circuit includes a first transistor T1, a second transistor T2 and a first capacitor C1, and the duration control sub-circuit includes a fifth transistor T5 through a ninth transistor T9 and a second capacitor C2.

As shown in FIG. 12, a control electrode of the first transistor T1 is electrically connected to the third node N3, a first electrode of the first transistor T1 is electrically connected to the first power supply terminal VDD, and a second electrode of the first transistor T1 is electrically connected to the first node N1; a control electrode of the second transistor T2 is electrically connected to the first scanning signal terminal G1, a first electrode of the second transistor T2 is electrically connected to the first data signal terminal Data1, and a second electrode of the second transistor T2 is electrically connected to the third node N3; a control electrode of the fifth transistor T5 is electrically connected to the fourth node N4, a first electrode of the fifth transistor T5 is electrically connected to the first node N1, and a second electrode of the fifth transistor T5 is electrically connected to the second node N2; a control electrode of the sixth transistor T6 is electrically connected to the second scanning signal terminal G2, a first electrode of the sixth transistor T6 is electrically connected to the second data signal terminal Data2, and a second electrode of the sixth transistor T6 is electrically connected to the fifth node N5; a control electrode of the seventh transistor T7 is electrically connected to the third scanning signal terminal G3, a first electrode of the seventh transistor T7 is electrically connected to the first control signal terminal S1, and a second electrode of the seventh transistor T7 is electrically connected to the fifth node N5; a control electrode of the eighth transistor T8 is electrically connected to the reset signal terminal Reset, a first electrode of the eighth transistor T8 is electrically connected to the first initial signal terminal INIT1, and a second electrode of the eighth transistor T8 is electrically connected to the fourth node N4; a control electrode of the ninth transistor T9 is electrically connected to the reset signal terminal Reset, a first electrode of the ninth transistor T9 is electrically connected to the second initial signal terminal INIT2, and a second electrode of the ninth transistor T9 is electrically connected to the fifth node N5; one plate of the first capacitor C1 is electrically connected to the third node N3, and the other plate of the first capacitor C1 is electrically connected to the third power supply terminal VSS or the first node N1; one plate of the second capacitor C2 is electrically connected to the fourth node N4, and the other plate of the second capacitor C2 is electrically connected to the fifth node N5. FIG. 12 is illustrated by taking the other plate of the first capacitor C1 being electrically connected to the third power supply terminal VSS as an example In an exemplary embodiment, the first transistor T1, the second transistor T2, and the fifth transistor T5 through the ninth transistor T9 are of the same type, so that their manufacturing processes can be simplified.

In an exemplary embodiment, the first transistor T1, the second transistor T2, and the fifth transistor T5 through the ninth transistor T9 are all metal oxide semiconductor transistors. The metal oxide semiconductor transistors can reduce leakage current to improve the performance of the pixel circuit, and can decrease the power consumption of the pixel circuit.

Figure 13:
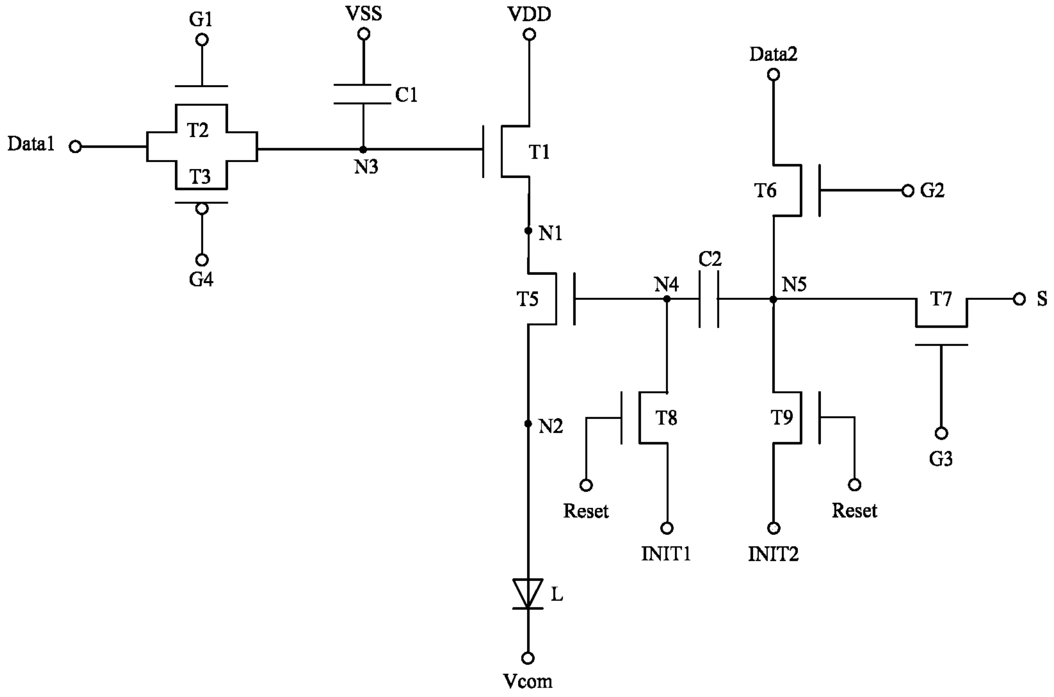
FIG. 13 is an equivalent circuit diagram II of a pixel circuit in accordance with an exemplary embodiment.

FIG. 13 is an equivalent circuit diagram II of a pixel circuit in accordance with an exemplary embodiment. As shown in FIG. 13, in an exemplary embodiment, the current control sub-circuit includes a first transistor T1, a second transistor T2, a third transistor T3 and a first capacitor C1, the duration control sub-circuit includes a fifth transistor T5 through a ninth transistor T9 and a second capacitor C2.

As shown in FIG. 13, a control electrode of the first transistor T1 is electrically connected to the third node N3, a first electrode of the first transistor T1 is electrically connected to the first power supply terminal VDD, and a second electrode of the first transistor T1 is electrically connected to the first node N1; a control electrode of the second transistor T2 is electrically connected to the first scanning signal terminal G1, a first electrode of the second transistor T2 is electrically connected to the first data signal terminal Data1, and a second electrode of the second transistor T2 is electrically connected to the third node N3; a control electrode of the third transistor T3 is electrically connected to the fourth scanning signal terminal G4, a first electrode of the third transistor T3 is electrically connected to the first data signal terminal Data1, and a second electrode of the third transistor T3 is electrically connected to the third node N3; a control electrode of the fifth transistor T5 is electrically connected to the fourth node N4, a first electrode of the fifth transistor T5 is electrically connected to the first node N1, and a second electrode of the fifth transistor T5 is electrically connected to the second node N2; a control electrode of the sixth transistor T6 is electrically connected to the second scanning signal terminal G2, a first electrode of the sixth transistor T6 is electrically connected to the second data signal terminal Data2, and a second electrode of the sixth transistor T6 is electrically connected to the fifth node N5; a control electrode of the seventh transistor T7 is electrically connected to the third scanning signal terminal G3, a first electrode of the seventh transistor T7 is electrically connected to the first control signal terminal S1, and a second electrode of the seventh transistor T7 is electrically connected to the fifth node N5; a control electrode of the eighth transistor T8 is electrically connected to the reset signal terminal Reset, a first electrode of the eighth transistor T8 is electrically connected to the first initial signal terminal INIT1, and a second electrode of the eighth transistor T8 is electrically connected to the fourth node N4; a control electrode of the ninth transistor T9 is electrically connected to the reset signal terminal Reset, a first electrode of the ninth transistor T9 is electrically connected to the second initial signal terminal INIT2, and a second electrode of the ninth transistor T9 is electrically connected to the fifth node N5; one plate of the first capacitor C1 is electrically connected to the third node N3, and the other plate of the first capacitor C1 is electrically connected to the third power supply terminal VSS or the first node N1; one plate of the second capacitor C2 is electrically connected to the fourth node N4, and the other plate of the second capacitor C2 is electrically connected to the fifth node N5. FIG. 13 is illustrated by taking the other plate of the first capacitor C1 being electrically connected to the third power supply terminal VSS as an example.

In an exemplary embodiment, the first transistor T1, the second transistor T2, and the fifth transistor T5 through the ninth transistor T9 are of the same type and opposite to the type of the third transistor T3. Illustratively, the first transistor T1, the second transistor T2, and the fifth transistor T5 through the ninth transistor T9 are N-type transistors, and the third transistor T3 is a P-type transistor.

In an exemplary embodiment, the first transistor T1, the second transistor T2, the third transistor T3, and the fifth transistor T5 through the ninth transistor T9 are all metal oxide semiconductor transistors. The metal oxide semiconductor transistors can reduce leakage current to improve the performance of the pixel circuit, and can decrease the power consumption of the pixel circuit.

Figure 14:
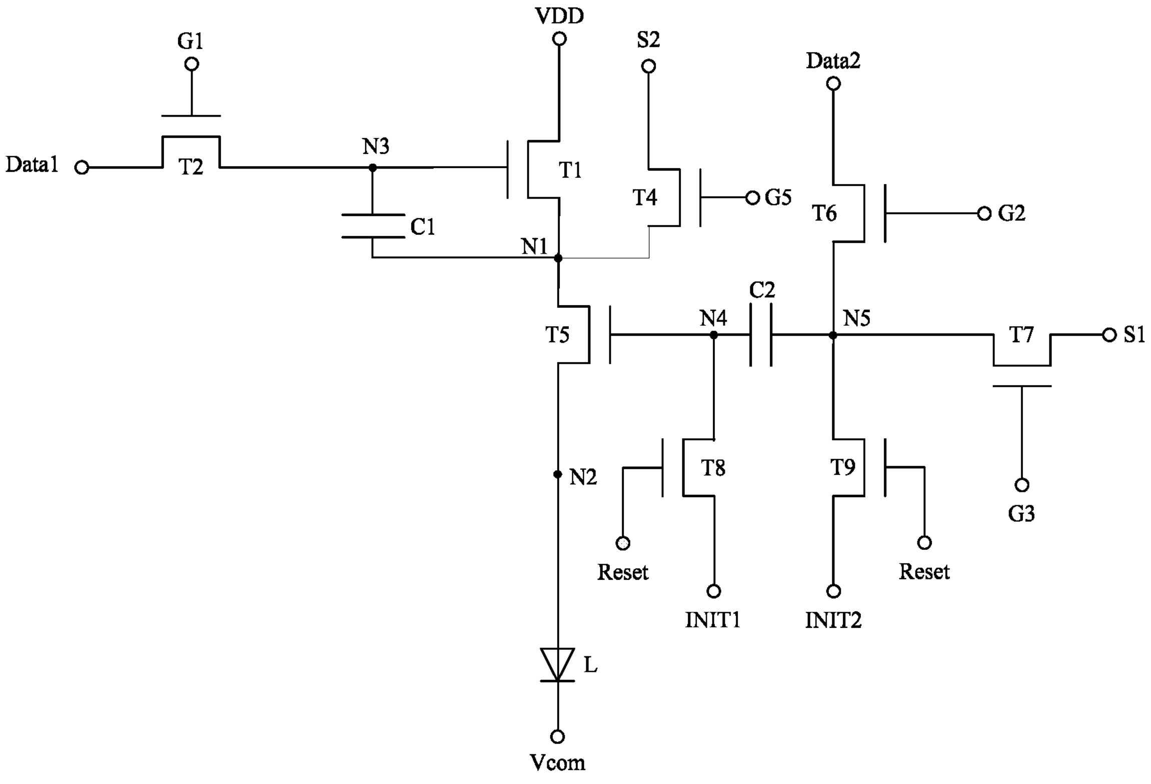
FIG. 14 is an equivalent circuit diagram III of a pixel circuit in accordance with an exemplary embodiment.

FIG. 14 is an equivalent circuit diagram III of a pixel circuit in accordance with an exemplary embodiment. As shown in FIG. 14, in an exemplary embodiment, the driving circuit further includes a node control sub-circuit, the current control sub-circuit includes a first transistor T1, a second transistor T2 and a first capacitor C1, the node control sub-circuit includes a fourth transistor T4, and the duration control sub-circuit includes a fifth transistor T5 through a ninth transistor T9 and a second capacitor C2.

As shown in FIG. 14, a control electrode of the first transistor T1 is electrically connected to the third node N3, a first electrode of the first transistor T1 is electrically connected to the first power supply terminal VDD, and a second electrode of the first transistor T1 is electrically connected to the first node N1; a control electrode of the second transistor T2 is electrically connected to the first scanning signal terminal G1, a first electrode of the second transistor T2 is electrically connected to the first data signal terminal Data1, and a second electrode of the second transistor T2 is electrically connected to the third node N3; a control electrode of the fourth transistor T4 is electrically connected to the fifth scanning signal terminal G5, a first electrode of the fourth transistor T4 is electrically connected to the second control signal terminal S2, and a second electrode of the fourth transistor T4 is electrically connected to the first node N1; a control electrode of the fifth transistor T5 is electrically connected to the fourth node N4, a first electrode of the fifth transistor T5 is electrically connected to the first node N1, and a second electrode of the fifth transistor T5 is electrically connected to the second node N2; a control electrode of the sixth transistor T6 is electrically connected to the second scanning signal terminal G2, a first electrode of the sixth transistor T6 is electrically connected to the second data signal terminal Data2, and a second electrode of the sixth transistor T6 is electrically connected to the fifth node N5; a control electrode of the seventh transistor T7 is electrically connected to the third scanning signal terminal G3, a first electrode of the seventh transistor T7 is electrically connected to the first control signal terminal S1, and a second electrode of the seventh transistor T7 is electrically connected to the fifth node N5; a control electrode of the eighth transistor T8 is electrically connected to the reset signal terminal Reset, a first electrode of the eighth transistor T8 is electrically connected to the first initial signal terminal INIT1, and a second electrode of the eighth transistor T8 is electrically connected to the fourth node N4; a control electrode of the ninth transistor T9 is electrically connected to the reset signal terminal Reset, a first electrode of the ninth transistor T9 is electrically connected to the second initial signal terminal INIT2, and a second electrode of the ninth transistor T9 is electrically connected to the fifth node N5; one plate of the first capacitor C1 is electrically connected to the third node N3, and the other plate of the first capacitor C1 is electrically connected to the third power supply terminal VSS or the first node N1; one plate of the second capacitor C2 is electrically connected to the fourth node N4, and the other plate of the second capacitor C2 is electrically connected to the fifth node N5. FIG. 14 is illustrated by taking the other plate of the first capacitor C1 being electrically connected to the first node N1 as an example.

In an exemplary embodiment, the first transistor T1, the second transistor T2, the fourth transistor T4 through the ninth transistor T9 are of the same type, so that their manufacturing processes can be simplified.

In an exemplary embodiment, the first transistor T1, the second transistor T2, and the fourth transistor T4 through the ninth transistor T9 are all metal oxide semiconductor transistors. The metal oxide semiconductor transistors can reduce leakage current to improve the performance of the pixel circuit, and can decrease the power consumption of the pixel circuit.

Figure 15:
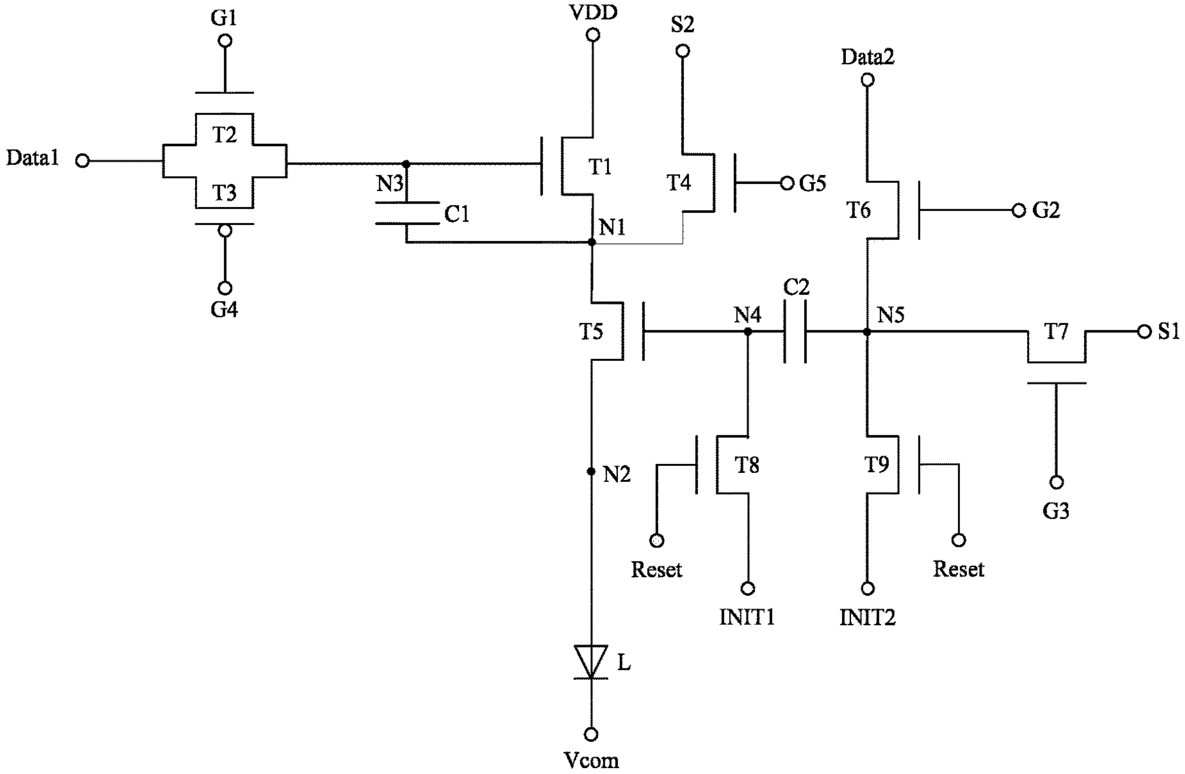
FIG. 15 is an equivalent circuit diagram IV of a pixel circuit in accordance with an exemplary embodiment.

FIG. 15 is an equivalent circuit diagram IV of a pixel circuit in accordance with an exemplary embodiment. As shown in FIG. 15, in an exemplary embodiment, the driving circuit further includes a node control sub-circuit, the current control sub-circuit includes a first transistor T1, a second transistor T2, a third transistor T3 and a first capacitor C1, the node control sub-circuit includes a fourth transistor T4, and the duration control sub-circuit includes a fifth transistor T5 through a ninth transistor T9 and a second capacitor C2.

As shown in FIG. 15, a control electrode of the first transistor T1 is electrically connected to the third node N3, a first electrode of the first transistor T1 is electrically connected to the first power supply terminal VDD, and a second electrode of the first transistor T1 is electrically connected to the first node N1; a control electrode of the second transistor T2 is electrically connected to the first scanning signal terminal G1, a first electrode of the second transistor T2 is electrically connected to the first data signal terminal Data1, and a second electrode of the second transistor T2 is electrically connected to the third node N3; a control electrode of the third transistor T3 is electrically connected to the fourth scanning signal terminal G4, a first electrode of the third transistor T3 is electrically connected to the first data signal terminal Data1, and a second electrode of the third transistor T3 is electrically connected to the third node N3; a control electrode of the fourth transistor T4 is electrically connected to the fifth scanning signal terminal G5, a first electrode of the fourth transistor T4 is electrically connected to the second control signal terminal S2, and a second electrode of the fourth transistor T4 is electrically connected to the first node N1; a control electrode of the fifth transistor T5 is electrically connected to the fourth node N4, a first electrode of the fifth transistor T5 is electrically connected to the first node N1, and a second electrode of the fifth transistor T5 is electrically connected to the second node N2; a control electrode of the sixth transistor T6 is electrically connected to the second scanning signal terminal G2, a first electrode of the sixth transistor T6 is electrically connected to the second data signal terminal Data2, and a second electrode of the sixth transistor T6 is electrically connected to the fifth node N5; a control electrode of the seventh transistor T7 is electrically connected to the third scanning signal terminal G3, a first electrode of the seventh transistor T7 is electrically connected to the first control signal terminal S1, and a second electrode of the seventh transistor T1 is electrically connected to the fifth node N5; a control electrode of the eighth transistor T8 is electrically connected to the reset signal terminal Reset, a first electrode of the eighth transistor T8 is electrically connected to the first initial signal terminal INIT1, and a second electrode of the eighth transistor T8 is electrically connected to the fourth node N4; a control electrode of the ninth transistor T9 is electrically connected to the reset signal terminal Reset, a first electrode of the ninth transistor T9 is electrically connected to the second initial signal terminal INIT2, and a second electrode of the ninth transistor T9 is electrically connected to the fifth node N5; one plate of the first capacitor C1 is electrically connected to the third node N3, and the other plate of the first capacitor C1 is electrically connected to the third power supply terminal VSS or the first node N1; one plate of the second capacitor C2 is electrically connected to the fourth node N4, and the other plate of the second capacitor C2 is electrically connected to the fifth node N5. FIG. 15 is illustrated by taking the other plate of the first capacitor C1 being electrically connected to the first node N1 as an example.

In an exemplary embodiment, the first transistor T1, the second transistor T2, and the fourth transistor T4 through the ninth transistor T9 are of the same type and are opposite to the type of the third transistor. Illustratively, the first transistor T1, the second transistor T2, the fourth transistor T4 through the ninth transistor T9 may be N-type transistors, and the third transistor T3 may be a P-type transistor.

In an exemplary embodiment, the first transistor T1 through the ninth transistor T9 may all be metal oxide semiconductor transistors. The metal oxide semiconductor transistors can reduce leakage current to improve the performance of the pixel circuit, and can decrease the power consumption of the pixel circuit.

In an exemplary embodiment, the first transistor T1 may be referred to as a driving transistor, and in the first transistor T1, according to a potential difference between the control electrode and the first electrode of the first transistor T1, a driving current flowing between the first power supply terminal VDD and the first node N1 is determined.

In an exemplary embodiment, all of the transistors in the present disclosure may be disposed on a silicon-based substrate and are metal oxide semiconductor transistors. An aspect ratio of an active layer of a metal oxide semiconductor transistor is on the order of (sub) microns, i.e., it is smaller in size.

The aspect ratio of the active layer of the metal oxide semiconductor transistor is on the order of (sub) microns, and a display substrate where the pixel circuit is located can achieve high PPI, usually above 2000-3000 PPI, so as to prevent occurrence of the screen-door effect. The electrical performance of the metal oxide semiconductor transistor is relatively stable, such that the stability of the electrical performance of the driving circuit is better.

In an exemplary embodiment, the pixel circuit is disposed on a display substrate, and there are a display stage and a non-display stage configured for the display substrate.

Figure 16:
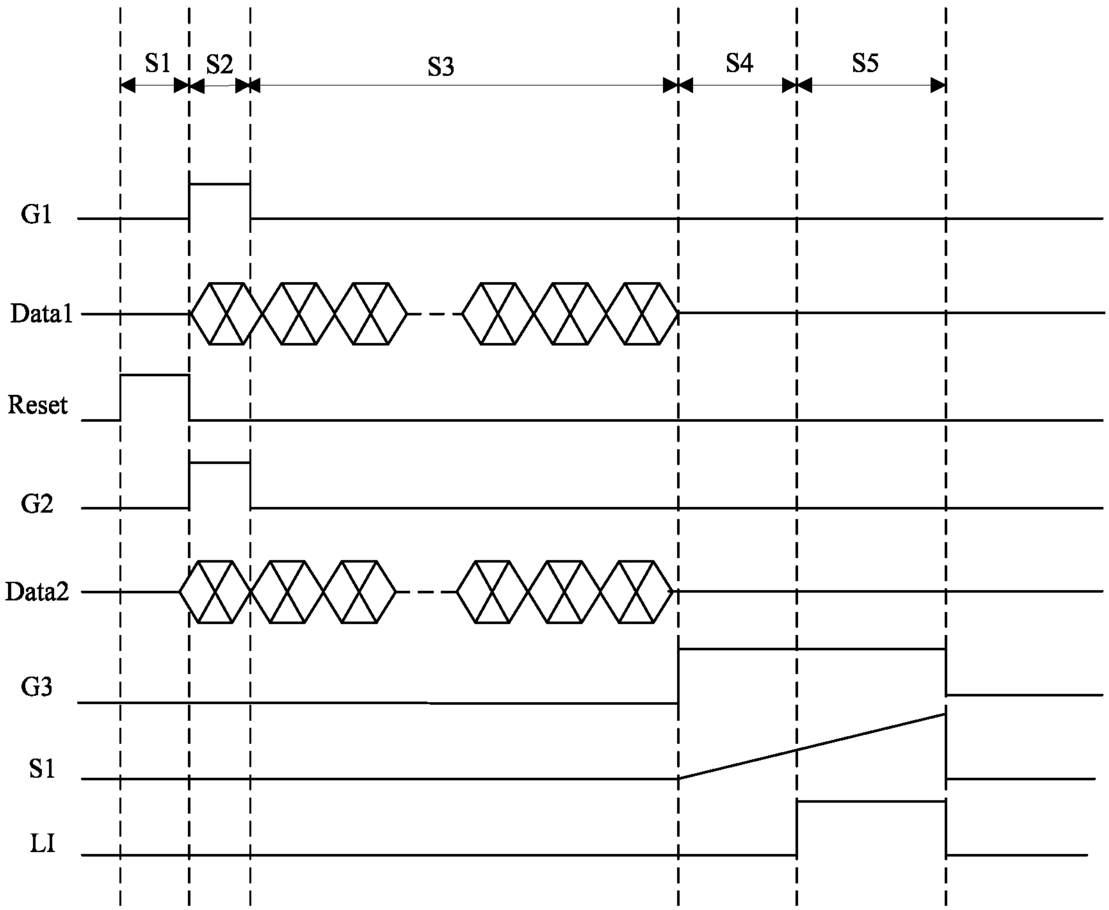
FIG. 16 is a working sequence diagram of the pixel circuit provided in FIG. 12 in a display stage.

An exemplary embodiment of the present disclosure will be described below with reference to a working process of the pixel circuit illustrated in FIG. 12 in the display stage. FIG. 12 is illustrated by taking the first transistor T1, the second transistor T2, and the fifth transistor T5 through the ninth transistor T9 being N-type transistors as an example. The pixel circuit in FIG. 12 includes the first transistor T1, the second transistor T2, the fifth transistor T5 through the ninth transistor T9, two capacitors C (the first capacitor C1 and the second capacitor C2) and 11 signal terminals (the first data signal terminal Data1, the second data signal terminal Data2, the first scanning signal terminal G1, the second scanning signal terminal G2, the third scanning signal terminal G3, the first control signal terminal S1, the reset signal terminal Reset, the first initial signal terminal INIT1, the second initial signal terminal INIT2, the first power supply terminal VDD and the third power supply terminal VSS). FIG. 16 is a working sequence diagram of the pixel circuit provided in FIG. 12 in the display stage.

With reference to FIGS. 12 and 16, the working process of the pixel circuit in the display stage may include the following stages.

In a first stage S1, the signal of the reset signal terminal Reset is a high-level signal, the eighth transistor T8 and the ninth transistor T9 are turned on, the signal of the first initial signal terminal INIT1 is written to the fourth node N4 through the turned-on eighth transistor, the signal of the second initial signal terminal INIT2 is written to the fifth node N5 through the turned-on ninth transistor T9, and the two plates of the second capacitor C2 are initialized (reset) and its internal pre-stored voltage is cleared, to complete the initialization. In this stage, a voltage value of a signal of the fourth node N4 is V1, a voltage value of a signal of the fifth node N5 is V2, V1 being a voltage value of the signal of the first initial signal terminal INIT1, and V2 being a voltage value of the signal of the second initial signal terminal INIT2, and the light-emitting element L does not emit light.

In a second stage S2, the signal of the first scanning signal terminal G1 is a high-level signal, the first data signal terminal Data1 outputs a data voltage, the second transistor T2 is turned on, the signal of the first data signal terminal Data1 is written to the third node N3, the first transistor T1 is turned on to provide a driving current to the first node N1, the signal of the second scanning signal terminal G2 is a high-level signal, the second data signal terminal Data2 outputs a data voltage, the sixth transistor T6 is turned on, and the signal of the second data signal terminal Data2 is written to the fifth node N5. In this stage, the voltage value of the signal of the fifth node N5 is Vdata2, which is a voltage value of the signal of the second data signal terminal. Under the bootstrap action of the second capacitor C2, the voltage value of the signal of the fourth node N4 is V1−V2+Vdata2, and the light-emitting element L does not emit light.

In a third stage S3, the signal of the first scanning signal terminal G1 is a low-level signal, the second transistor T2 is turned off, a signal of the third node N3 remains the signal of the previous node, the first transistor T1 keeps being turned on to provide a driving current to the first node N1, the signal of the second scanning signal terminal G2 is a low-level signal, the sixth transistor T6 is turned off, and the light-emitting element L does not emit light.

In a fourth stage S4, the signal of the third scanning signal terminal G3 is a high-level signal, the seventh transistor T7 is turned on, and the signal of the first control signal terminal S1 is written to the fifth node N5. Under the bootstrap action of the second capacitor C2, the voltage of the signal of the fourth node N4 is V1−V2+Vdata2+ΔV, ΔV being a voltage value of the signal of the first control signal terminal S1. ΔV gradually increases, and the voltage value of the signal of the fourth node N4 is a voltage value of the control electrode of the fourth transistor. In this stage, ΔV is smaller, so that Vdata2 and ΔV do not satisfy a turn-on condition of the fifth transistor T5, the fifth transistor T5 is turned off, and the light-emitting element L does not emit light. The turn-on condition of the fifth transistor T5 is Vgs>Vth5 and Vds>Vgs−Vth5, wherein Vgs is a voltage difference between the control electrode and the first electrode of the fifth transistor T5, Vds is a voltage difference between the first electrode and the second drain electrode of the fifth transistor T5, and Vth5 is a threshold voltage of the fifth transistor T5.

In a fifth stage S5, the signal of the third scanning signal terminal G3 is a high-level signal, the seventh transistor T7 is turned on, and signals of the first control signal terminal S1 are continuously written to the fifth node N5. Under the bootstrap action of the second capacitor C2, the voltage of the signal of the fourth node N4 is V1−V2+Vdata2+ΔV. As ΔV increases, Vdata2 and ΔV satisfy the turn-on condition of the fifth transistor T5. The fifth transistor T5 is turned on, the signal of the first node N1 is written to the second node N2 through the turned-on fifth transistor T5, and the light-emitting element L emits light.

In an exemplary embodiment, the working process of the pixel circuit in the display stage may not include the third stage, but only include the first stage, the second stage, the fourth stage and the fifth stage. The working process of the pixel circuit in the display stage may depend on a duration of a display frame.

FIG. 12 is illustrated by taking the first capacitor C1 being electrically connected to the third node N3 and the third power supply terminal VSS as an example. The working sequence in FIG. 16 can be applied equally to the case where the first capacitor C1 is electrically connected to the third node N2 and the first node N1.

Figure 17:
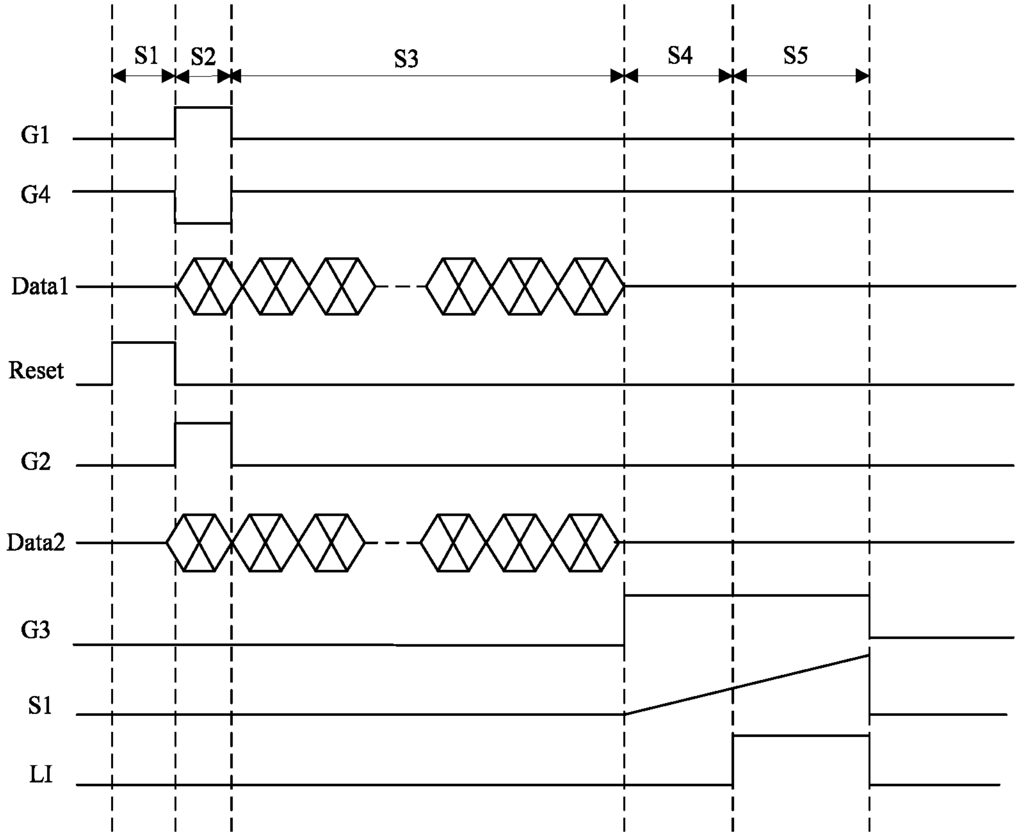
FIG. 17 is a working sequence diagram of the pixel circuit provided in FIG. 13 in a display stage.

An exemplary embodiment of the present disclosure will be described below with reference to a working process of the pixel circuit illustrated in FIG. 13 in the display stage. FIG. 13 is illustrated by taking the first transistor T1, the second transistor T2, and the fifth transistor T5 through the ninth transistor T9 being N-type transistors and the third transistor T3 being a P-type transistor as an example. The pixel circuit in FIG. 13 includes the first transistor T1, the second transistor T2, the third transistor T3, the fifth transistor T5 through the ninth transistor T9, two capacitors C (the first capacitor C1 and the second capacitor C2) and 12 signal terminals (the first data signal terminal Data1, the second data signal terminal Data2, the first scanning signal terminal G1, the second scanning signal terminal G2, the third scanning signal terminal G3, the fourth scanning signal terminal G4, the first control signal terminal S1, the reset signal terminal Reset, the first initial signal terminal INIT1, the second initial signal terminal INIT2, the first power supply terminal VDD and the third power supply terminal VSS). FIG. 17 is a working sequence diagram of the pixel circuit provided in FIG. 13 in the display stage.

With reference to FIGS. 13 and 17, the working process of the pixel circuit in the display stage may include a first stage S1 to a fifth stage S5.

The first stage S1 and the third stage S3 to the fifth stage S5 in the working process of the pixel circuit in FIG. 13 are the same as the first stage S1 and the third stage S3 to the fifth stage S5 in the working process of the pixel circuit in FIG. 12, respectively, and will not be repeated herein. The second stage S2 in the working process of the pixel circuit in FIG. 13 is different from the second stage S2 in the working process of the pixel circuit in FIG. 12.

In the second stage S2, the signal of the first scanning signal terminal G1 is a high-level signal, the signal of the fourth scanning signal terminal G4 is a low-level signal, the first data signal terminal Data1 outputs a data voltage, the second transistor T2 and the third transistor T3 are turned on, the signal of the first data signal terminal Data1 is written to the third node N3, the first transistor T1 is turned on to provide a driving current to the first node N1, the signal of the second scanning signal terminal G2 is a high-level signal, the second data signal terminal Data2 outputs a data voltage, the sixth transistor T6 is turned on, and the signal of the second data signal terminal Data2 is written to the fifth node N5. In this stage, the voltage value of the signal of the fifth node N5 is Vdata2, which is the voltage value of the signal of the second data signal terminal. Under the bootstrap action of the second capacitor C2, the voltage value of the signal of the fourth node N4 is V1−V2+Vdata2, and the light-emitting element L does not emit light.

FIG. 13 is illustrated by taking the first capacitor C1 being electrically connected to the third node N3 and the third power supply terminal VSS as an example. The working sequence in FIG. 17 can be applied equally to the case where the first capacitor C1 is electrically connected to the third node N3 and the first node N1.

Figure 18:
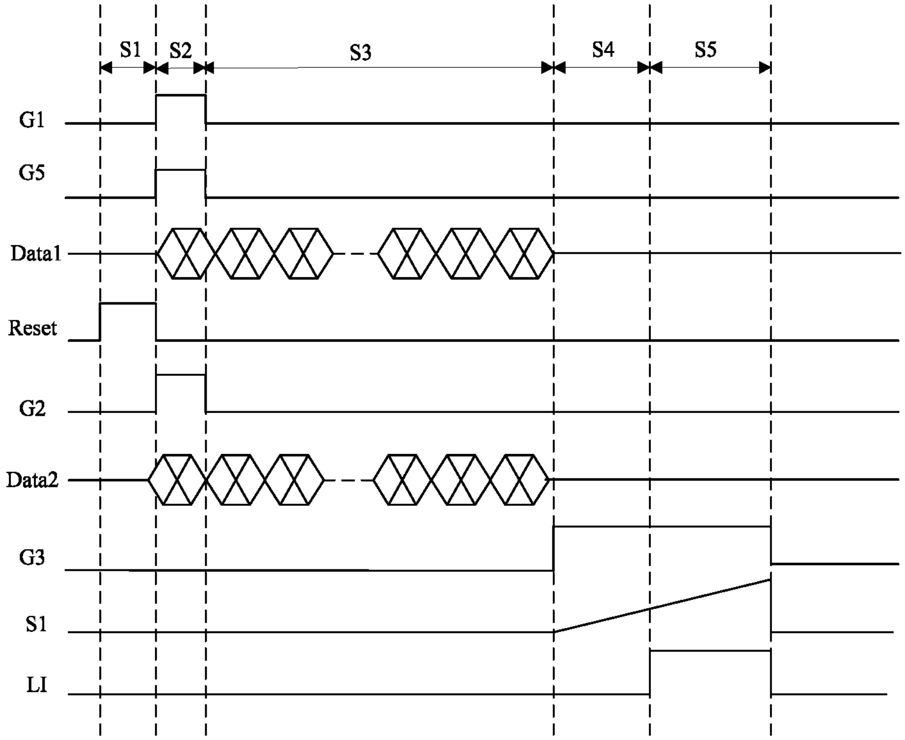
FIG. 18 is a working sequence diagram of the pixel circuit provided in FIG. 14 in a display stage.

An exemplary embodiment of the present disclosure will be described below with reference to a working process of the pixel circuit illustrated in FIG. 14 in the display stage. FIG. 14 is illustrated by taking the first transistor T1, the second transistor T2, the fourth transistor T4, and the fifth transistor T5 through the ninth transistor T9 being N-type transistors as an example. The pixel circuit in FIG. 14 includes the first transistor T1, the second transistor T2, the fourth transistor T4, the fifth transistor T5 through the ninth transistor T9, two capacitors C (the first capacitor C1 and the second capacitor C2) and 11 signal terminals (the first data signal terminal Data1, the second data signal terminal Data2, the first scanning signal terminal G1, the second scanning signal terminal G2, the third scanning signal terminal G3, the fifth scanning signal terminal G5, the first control signal terminal S1, the reset signal terminal Reset, the first initial signal terminal INIT1, the second initial signal terminal INIT2 and the first power supply terminal VDD). FIG. 18 is a working sequence diagram of the pixel circuit provided in FIG. 14 in the display stage.

With reference to FIGS. 14 and 18, the working process of the pixel circuit in the display stage may include a first stage S1 to a fifth stage S5.

The first stage S1 and the third stage S3 to the fifth stage S5 in the working process of the pixel circuit in FIG. 14 are the same as the first stage S1 and the third stage S3 to the fifth stage S5 in the working process of the pixel circuit in FIG. 12, respectively, and will not be repeated herein. The second stage S2 in the working process of the pixel circuit in FIG. 14 is different from the second stage S2 in the working process of the pixel circuit in FIG. 12.

In the second stage S2, the signal of the first scanning signal terminal G1 is a high-level signal, the first data signal terminal Data1 outputs a data voltage, the second transistor T2 is turned on, the signal of the first data signal terminal Data1 is written to the third node N3, the signal of the fifth scanning signal terminal G5 is a high-level signal, the signal of the second control signal terminal S2 is written to the first node N1, the first transistor T1 is turned on to provide a driving current to the first node N1, the signal of the second scanning signal terminal G2 is a high-level signal, the second data signal terminal Data2 outputs a data voltage, the sixth transistor T6 is turned on, and the signal of the second data signal terminal Data2 is written to the fifth node N5. In this stage, the voltage value of the signal of the fifth node N5 is Vdata2, which is the voltage value of the signal of the second data signal terminal. Under the bootstrap action of the second capacitor C2, the voltage value of the signal of the fourth node N4 is V1−V2+Vdata2, and the light-emitting element L does not emit light.

FIG. 14 is illustrated by taking the first capacitor C1 being electrically connected to the third node N3 and the first node N1 as an example. The working process in FIG. 18 can be applied equally to the case where the first capacitor C1 is electrically connected to the third node N3 and the third power supply terminal VSS.

Figure 19:
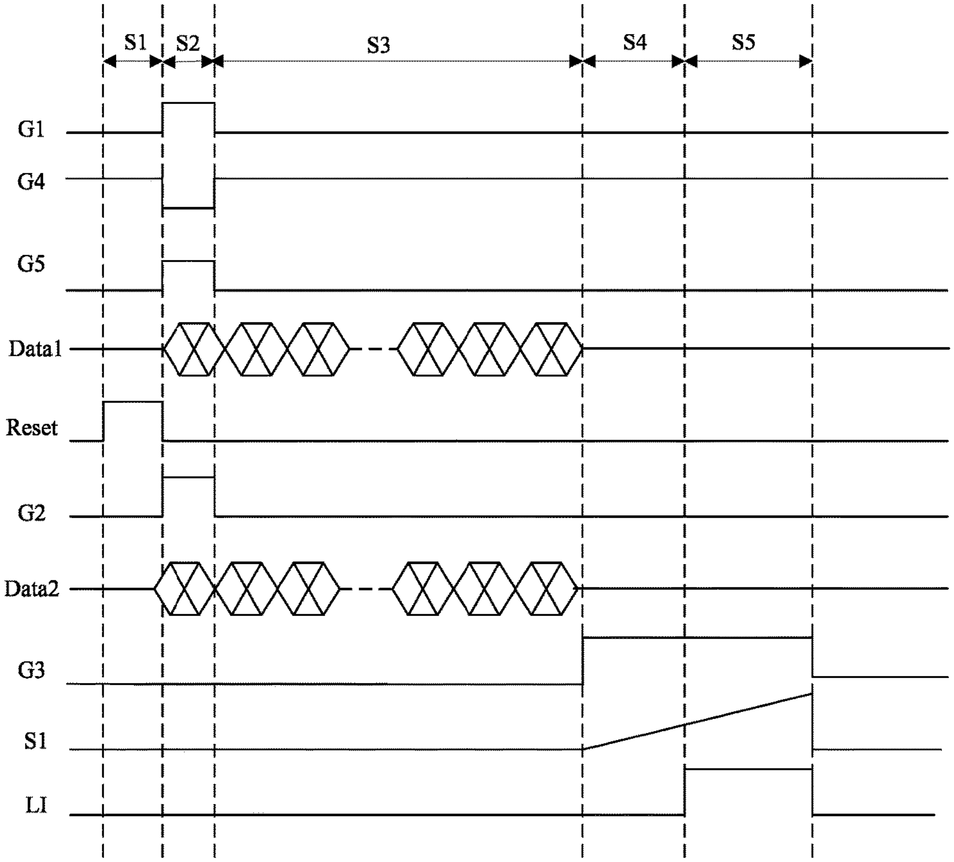
FIG. 19 is a working sequence diagram of the pixel circuit provided in FIG. 15 in a display stage.

An exemplary embodiment of the present disclosure will be described below with reference to a working process of the pixel circuit illustrated in FIG. 15 in the display stage. FIG. 15 is illustrated by taking the first transistor T1, the second transistor T2, the fourth transistor T4, and the fifth transistor T5 through the ninth transistor T9 being N-type transistors and the third transistor T3 being a P-type transistor as an example. The pixel circuit in FIG. 15 includes the first transistor T1 through the ninth transistor T9, two capacitors C (the first capacitor C1 and the second capacitor C2) and 12 signal terminals (the first data signal terminal Data1, the second data signal terminal Data2, the first scanning signal terminal G1, the second scanning signal terminal G2, the third scanning signal terminal G3, the fourth scanning signal terminal G4, the fifth scanning signal terminal G5, the first control signal terminal S1, the reset signal terminal Reset, the first initial signal terminal INIT1, the second initial signal terminal INIT2 and the first power supply terminal VDD). FIG. 19 is a working sequence diagram of the pixel circuit provided in FIG. 15 in the display stage.

With reference to FIGS. 15 and 19, the working process of the pixel circuit in the display stage may include a first stage S1 to a fifth stage S5.

The first stage S1 and the third stage S3 to the fifth stage S5 in the working process of the pixel circuit in FIG. 15 are the same as the first stage S1 and the third stage S3 to the fifth stage S5 in the working process of the pixel circuit in FIG. 12, respectively, and will not be repeated herein. The second stage S2 in the working process of the pixel circuit in FIG. 15 is different from the second stage S2 in the working process of the pixel circuit in FIG. 12.

In the second stage S2, the signal of the first scanning signal terminal G1 is a high-level signal, the signal of the fourth scanning signal terminal G4 is a low-level signal, the first data signal terminal Data1 outputs a data voltage, the second transistor T2 is turned on, the signal of the first data signal terminal Data1 is written to the third node N3, the signal of the fifth scanning signal terminal G5 is a high-level signal, the signal of the second control signal terminal S2 is written to the first node N1, the first transistor T1 is turned on to provide a driving current to the first node N1, the signal of the second scanning signal terminal G2 is a high-level signal, the second data signal terminal Data2 outputs a data voltage, the sixth transistor T6 is turned on, and the signal of the second data signal terminal Data2 is written to the fifth node N5. In this stage, the voltage value of the signal of the fifth node N5 is Vdata2, which is the voltage value of the signal of the second data signal terminal. Under the bootstrap action of the second capacitor C2, the voltage value of the signal of the fourth node N4 is V1−V2+Vdata2, and the light-emitting element L does not emit light.

FIG. 15 is illustrated by taking the first capacitor C1 being electrically connected to the third node N3 and the first node N1 as an example. The working process in FIG. 19 can be applied equally to the case where the first capacitor C1 is electrically connected to the third node N3 and the third power supply terminal VSS.

The current control sub-circuit in the present disclosure is configured to control an amplitude of a voltage of the control electrode of the first transistor, and may control an amplitude of the luminance of the light-emitting element L. The duration control sub-circuit controls the time during which the amplitude of the voltage of the control electrode of the first transistor is remained the same, and may control the light-emitting time of the light-emitting element L.

There is a source and follower relationship between the first electrode of the light-emitting element and the control electrode of the first transistor in the present disclosure.

In the present disclosure, the turn-on time of the fifth transistor T5 is controlled according to the signal of the second data signal terminal Data2, so as to control the light-emitting time of the light-emitting element L.

Figure 20:
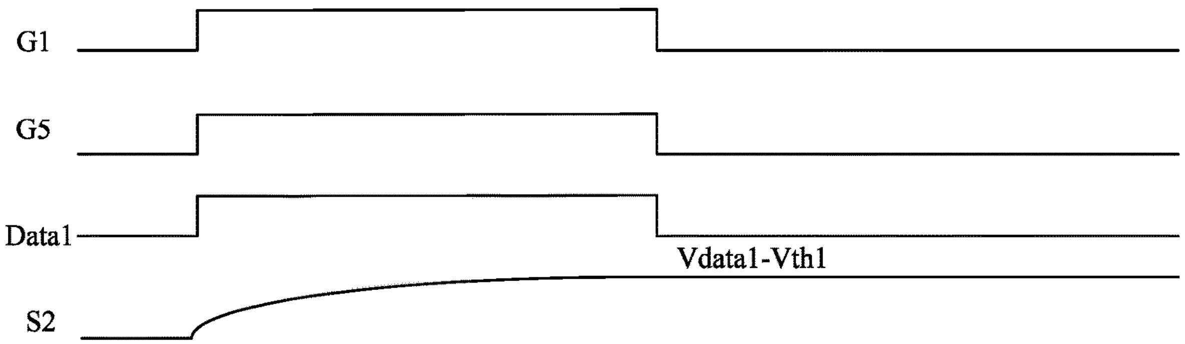
FIG. 20 is a working sequence diagram of the pixel circuit provided in FIG. 14 in a non-display stage.

An exemplary embodiment of the present disclosure will be described below with reference to a working process of the pixel circuit illustrated in FIG. 14 in the non-display stage. FIG. 14 is illustrated by taking the first transistor T1, the second transistor T2, the fourth transistor T4, and the fifth transistor T5 through the ninth transistor T9 being N-type transistors as an example. The pixel circuit in FIG. 14 includes the first transistor T1, the second transistor T2, the fourth transistor T4, the fifth transistor T5 through a ninth transistor T9, two capacitors C (the first capacitor C1 and the second capacitor C2) and 11 signal terminals (the first data signal terminal Data1, the second data signal terminal Data2, the first scanning signal terminal G1, the second scanning signal terminal G2, the third scanning signal terminal G3, the fifth scanning signal terminal G5, the first control signal terminal S1, the reset signal terminal Reset, the first initial signal terminal INIT1, the second initial signal terminal INIT2 and the first power supply terminal VDD). FIG. 20 is a working sequence diagram of the pixel circuit provided in FIG. 14 in the non-display stage.

With reference to FIGS. 14 and 20, the working process of the pixel circuit in the non-display stage may include the following process: the signal of the first scanning signal terminal G1 is a high-level signal, the first data signal terminal Data1 outputs a data voltage, the second transistor T2 is turned on, the signal of the first data signal terminal Data1 is written to the third node N3 through the turned-on second transistor T2, the first transistor T1 is turned on, the signal of the first power supply terminal VDD charges the first node N1 through the turned-on first transistor until a voltage value of the signal of the first node N1 is Vdata1−Vth1, Vdata1 being a voltage value of the signal of the first Data signal terminal Data1, and Vth1 being the threshold voltage of the first transistor, at which point the first transistor is turned off, the signal of the fifth scanning signal terminal G5 is a high-level signal, and the fourth transistor is turned on to read the signal of the first node N1 to the second control signal terminal S2.

In the present disclosure, the threshold voltage Vth1 of the first transistor can be obtained according to the second control signal terminal S2 by reading the signal of the first node N1 to the second control signal terminal S2, and the data signal of the first data signal terminal Data1 in the display stage is compensated externally according to the threshold voltage Vth1 of the first transistor.

Figure 21:
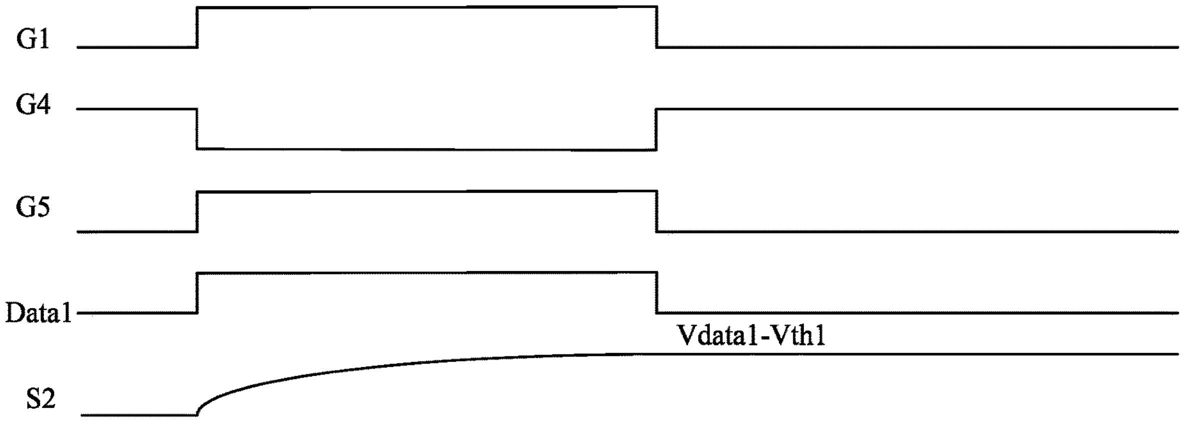
FIG. 21 is a working sequence diagram of the pixel circuit provided in FIG. 15 in a non-display stage.

An exemplary embodiment of the present disclosure will be described below with reference to a working process of the pixel circuit illustrated in FIG. 15 in the non-display stage. FIG. 15 is illustrated by taking the first transistor T1, the second transistor T2, the fourth transistor T4, and the fifth transistor T5 through the ninth transistor T9 being N-type transistors and the third transistor T3 be a P-type transistor as an example. The pixel circuit in FIG. 15 includes the first transistor T1 through the ninth transistor T9, two capacitors C (the first capacitor C1 and the second capacitor C2) and 12 signal terminals (the first data signal terminal Data1, the second data signal terminal Data2, the first scanning signal terminal G1, the second scanning signal terminal G2, the third scanning signal terminal G3, the fourth scanning signal terminal G4, the fifth scanning signal terminal G5, the first control signal terminal S1, the reset signal terminal Reset, the first initial signal terminal INIT1, the second initial signal terminal INIT2 and the first power supply terminal VDD). FIG. 21 is a working sequence diagram of the pixel circuit provided in FIG. 15 in the non-display stage.

With reference to FIGS. 15 and 21, the working process of the pixel circuit in the non-display stage may include the following process: the signal of the first scanning signal terminal G1 is a high-level signal, the signal of the fourth scanning signal terminal G4 is a low-level signal, the first data signal terminal Data1 outputs a data voltage, the second transistor T2 is turned on, the signal of the first data signal terminal Data1 is written to the third node N3 through the turned-on second transistor T2, the first transistor T1 is turned on, the signal of the first power supply terminal VDD charges the first node N1 through the turned-on first transistor T1 until a voltage value of the signal of the first node N1 is Vdata1−Vth1, Vdata1 being a voltage value of the signal of the first Data signal terminal Data1, and Vth1 being the threshold voltage of the first transistor, at which point the first transistor is turned off, the signal of the fifth scanning signal terminal G5 is a high-level signal, and the fourth transistor is turned on to read the signal of the first node N1 to the second control signal terminal S2.

In the present disclosure, the threshold voltage Vth1 of the first transistor can be obtained according to the second control signal terminal S2 by reading the signal of the first node N1 to the second control signal terminal S2, and the data signal of the first data signal terminal Data1 in the display stage is compensated externally according to the threshold voltage Vth1 of the first transistor.

An embodiment of the present disclosure further provides a driving method of a pixel circuit, which is used for driving the pixel circuit, the pixel circuit being located in a display substrate, and there are a display stage and a non-display stage configured for the display substrate. The driving method of the pixel circuit in accordance with the embodiment of the present disclosure may include the following steps.

In step 100, in the display stage and the non-display stage, a current control sub-circuit provides a driving current to a first node under the control of a first scanning signal terminal, a first data signal terminal and a first power supply terminal.

In step 200, in the display stage, a duration control sub-circuit provides a signal of the first node to a second node under the control of a second scanning signal terminal, a third scanning signal terminal, a second data signal terminal, a first control signal terminal, a reset signal terminal, a first initial signal terminal and a second initial signal terminal.

The pixel circuit is the pixel circuit in accordance with any one of the foregoing embodiments, and its implementation principle and implementation effect are similar to the foresaid implementation principle and implementation effect and will not be repeated herein.

The pixel circuit may further include a node control sub-circuit, and the driving method of the pixel circuit in accordance with the exemplary embodiment may further include the following steps:

in the display stage, the node control sub-circuit providing a signal of a second control signal terminal to the first node under the control of a fifth scanning signal terminal; and in the non-display stage, the node control sub-circuit reading the signal of the first node to the second control signal terminal under the control of the fifth scanning signal terminal.

An embodiment of the present disclosure further provides a display substrate including a display area and a non-display area surrounding at least one side of the display area, a plurality of pixels being disposed in the display area, and a pixel circuit being disposed within each of the pixels.

In an exemplary embodiment, the display area may be of the shape of a rectangle, a circle or a rounded rectangle, the present disclosure is not limited thereto.

The pixel circuit is the pixel circuit in accordance with any one of the foregoing embodiments, and its implementation principle and implementation effect are similar to the foresaid implementation principle and implementation effect and will not be repeated herein.

The display substrate in accordance with the embodiment of the present disclosure can be applied to display products of any resolution.

In an exemplary embodiment, when the pixel circuit includes the node control sub-circuit, the display substrate further includes a first chip connected to a second control signal terminal and a second chip connected to a first data signal terminal. The first chip is configured to provide a signal to the second control signal terminal in a display stage and read the signal passing through the second control signal terminal in a non-display stage, and is further configured to obtain a threshold voltage of a first transistor according to the signal of the second control signal terminal, generate a control signal according to the threshold voltage of the first transistor, and send the control signal to the second chip. The second chip provides a signal to the first data signal terminal according to the control signal.

In the present invention, the first data signal terminal can be compensated externally according to the first chip, so as to prolong the service life of the display substrate and improve the display effect of the display substrate.

An embodiment of the present disclosure further provides a display device including a display substrate.

The display substrate is the display substrate in accordance with any one of the foregoing embodiments, and its implementation principle and implementation effect are similar to the foresaid implementation principle and implementation effect and will not be repeated herein.

In an exemplary embodiment, the display device may be any product or component with a display function, such as a liquid crystal panel, electronic paper, an OLED panel, an active-matrix organic light emitting diode (AMOLED) panel, a mobile phone, a tablet computer, a television, a display, a notebook computer, a digital photo frame or a navigator.

The accompanying drawings of the present disclosure relate only to the structures involved in the embodiments of the present disclosure, and other structures may be understood with reference to conventional designs.

For the sake of clarity, the thickness and size of a layer or a micro structure is enlarged in the accompanying drawings used to describe the embodiments of the present disclosure. It can be understood that when an element such as a layer, film, region or substrate is described as being "on" or "under" another element, this element can be "directly" located "on" or "under" the other element, or an intermediate element may exist.

Although the embodiments of the present disclosure are disclosed as above, the contents described are intended to only easily understand the embodiments of the present disclosure, and are not intended to limit the present disclosure. Any skilled person in the art to which the present disclosure pertains may make any modifications and alterations in forms and details of implementation without departing from the spirit and scope of the present disclosure. However, the patent protection scope of the present disclosure should be subject to the scope defined by the appended claims.

The invention claimed is:

1. A pixel circuit, comprising a driving circuit and a light-emitting element connected in series between a first power supply terminal and a second power supply terminal; the driving circuit is configured to provide a driving current and control a conducting duration of a current pathway between the first power supply terminal and the second power supply terminal; the light-emitting element is configured to receive the driving current in the current pathway and emit light; the driving circuit comprises a current control sub-circuit and a duration control sub-circuit;

the current control sub-circuit, electrically connected to a first scanning signal terminal, a first data signal terminal, a first power supply terminal and a first node, respectively, is configured to provide a driving current to the first node under control of the first scanning signal terminal, the first data signal terminal and the first power supply terminal;

the duration control sub-circuit, electrically connected to a second scanning signal terminal, a third scanning signal terminal, a second data signal terminal, a first control signal terminal, a reset signal terminal, a first initial signal terminal and a second initial signal terminal, the first node and a second node, respectively, is configured to provide a signal of the first node to the second node under control of the second scanning signal terminal, the third scanning signal terminal, the second data signal terminal, the first control signal terminal, the reset signal terminal, the first initial signal terminal and the second initial signal terminal; and the light-emitting element is electrically connected to the second node and the second power supply terminal, respectively.

2. The pixel circuit according to claim 1, wherein based on a determination that a signal of the reset signal terminal is an active level signal, signals of the first scanning signal terminal, the second scanning signal terminal and the third scanning signal terminal are inactive level signals;

based on a determination that the signal of the first scanning signal terminal is an active level signal, the signal of the second scanning signal terminal is an active level signal, and the signals of the reset signal terminal and the third scanning signal terminal are inactive level signals;

based on a determination that the signal of the third scanning signal terminal is an active level signal, the signals of the reset signal terminal, the second scanning signal terminal and the third scanning signal terminal are inactive level signals;

a signal of the first control signal terminal is a ramp signal; and voltage values of signals of the first initial signal terminal and the second initial signal terminal are constant.

3. The pixel circuit according to claim 1, wherein the current control sub-circuit, electrically connected to a fourth scanning signal terminal, is configured to provide a driving current to the first node under control of the first scanning signal terminal, the fourth scanning signal terminal, the first data signal terminal and the first power supply terminal.

4. The pixel circuit according to claim 3, wherein based on a determination that a signal of the first scanning signal terminal is an active level signal, a signal of the fourth scanning signal terminal is an active level signal.

5. The pixel circuit according to claim 3, wherein the current control sub-circuit comprises a first writing sub-circuit, a first storage sub-circuit and a driving sub-circuit;

the first writing sub-circuit, electrically connected to the first scanning signal terminal, the fourth scanning signal terminal, the first data signal terminal and a third node, respectively, is configured to provide a signal of the first data signal terminal to the third node under control of the first scanning signal terminal and the fourth scanning signal terminal;

the first storage sub-circuit, electrically connected to the third node and a third power supply terminal, respectively, is configured to store a voltage difference between signals of the third node and the third power supply terminal, or electrically connected to the first node and the third node, respectively, is configured to store a voltage difference between the signals of the first node and the third node; and the driving sub-circuit, electrically connected to the first power supply terminal, the first node and the third node, respectively, is configured to provide a driving current to the first node under control of the third node and the first power supply terminal.

6. The pixel circuit according to claim 5, wherein the first writing sub-circuit comprises a second transistor and a third transistor;

a control electrode of the second transistor is electrically connected to the first scanning signal terminal, a first electrode of the second transistor is electrically connected to the first data signal terminal, and a second electrode of the second transistor is electrically connected to the third node;

a control electrode of the third transistor is electrically connected to the fourth scanning signal terminal, a first electrode of the third transistor is electrically connected to the first data signal terminal, and a second electrode of the third transistor is electrically connected to the third node; and the second transistor and the third transistor are of different types.

7. The pixel circuit according to claim 3, wherein the current control sub-circuit comprises a first transistor, a second transistor, a third transistor and a first capacitor, the duration control sub-circuit comprises fifth transistor through ninth transistor and a second capacitor;

a control electrode of the first transistor is electrically connected to a third node, a first electrode of the first transistor is electrically connected to the first power supply terminal, and a second electrode of the first transistor is electrically connected to the first node;

a control electrode of the second transistor is electrically connected to the first scanning signal terminal, a first electrode of the second transistor is electrically connected to the first data signal terminal, and a second electrode of the second transistor is electrically connected to the third node;

a control electrode of the third transistor is electrically connected to a fourth scanning signal terminal, a first electrode of the third transistor is electrically connected to the first data signal terminal, and a second electrode of the third transistor is electrically connected to the third node;

a control electrode of the fifth transistor is electrically connected to a fourth node, a first electrode of the fifth transistor is electrically connected to the first node, and a second electrode of the fifth transistor is electrically connected to the second node;

a control electrode of the sixth transistor is electrically connected to the second scanning signal terminal, a first electrode of the sixth transistor is electrically connected to the second data signal terminal, and a second electrode of the sixth transistor is electrically connected to a fifth node;

a control electrode of the seventh transistor is electrically connected to the third scanning signal terminal, a first electrode of the seventh transistor is electrically connected to the first control signal terminal, and a second electrode of the seventh transistor is electrically connected to the fifth node;

a control electrode of the eighth transistor is electrically connected to the reset signal terminal, a first electrode of the eighth transistor is electrically connected to the first initial signal terminal, and a second electrode of the eighth transistor is electrically connected to the fourth node;

a control electrode of the ninth transistor is electrically connected to the reset signal terminal, a first electrode of the ninth transistor is electrically connected to the second initial signal terminal, and a second electrode of the ninth transistor is electrically connected to the fifth node;

one plate of the first capacitor is electrically connected to the third node, and the other plate of the first capacitor is electrically connected to a third power supply terminal or the first node;

one plate of the second capacitor is electrically connected to the fourth node, and the other plate of the second capacitor is electrically connected to the fifth node;

the first transistor, the second transistor, and the fifth transistor through ninth transistor are of a same type and are opposite to a type of the third transistor; and the first transistor, the second transistor, the third transistor, and the fifth transistor through ninth transistor are all metal oxide semiconductor transistors.

8. The pixel circuit according to claim 1, wherein the driving circuit further comprises a node control sub-circuit;

the node control sub-circuit, electrically connected to a fifth scanning signal terminal, a second control signal terminal and the first node, respectively, is configured to provide a signal of the second control signal terminal to the first node or read the signal of the first node to the second control signal terminal under control of the fifth scanning signal terminal; and a voltage value of the signal of the second control signal terminal is constant.

9. The pixel circuit according to claim 8, wherein based on a determination that the signal of the first scanning signal terminal is an active level signal, a signal of the fifth scanning signal terminal is an active level signal.

10. The pixel circuit according to claim 8, wherein the node control sub-circuit comprises a fourth transistor; and a control electrode of the fourth transistor is electrically connected to the fifth scanning signal terminal, a first electrode of the fourth transistor is electrically connected to the second control signal terminal, and a second electrode of the fourth transistor is electrically connected to the first node.

11. The pixel circuit according to claim 8, wherein the current control sub-circuit comprises a first transistor, a second transistor and a first capacitor, the node control sub-circuit comprises a fourth transistor, and the duration control sub-circuit comprises fifth transistor through ninth transistor and a second capacitor;

a control electrode of the first transistor is electrically connected to a third node, a first electrode of the first transistor is electrically connected to the first power supply terminal, and a second electrode of the first transistor is electrically connected to the first node;

a control electrode of the second transistor is electrically connected to the first scanning signal terminal, a first electrode of the second transistor is electrically connected to the first data signal terminal, and a second electrode of the second transistor is electrically connected to the third node;

a control electrode of the fourth transistor is electrically connected to the fifth scanning signal terminal, a first electrode of the fourth transistor is electrically connected to the second control signal terminal, and a second electrode of the fourth transistor is electrically connected to the first node;

a control electrode of the fifth transistor is electrically connected to a fourth node, a first electrode of the fifth transistor is electrically connected to the first node, and a second electrode of the fifth transistor is electrically connected to the second node;

a control electrode of the sixth transistor is electrically connected to the second scanning signal terminal, a first electrode of the sixth transistor is electrically connected to the second data signal terminal, and a second electrode of the sixth transistor is electrically connected to a fifth node;

a control electrode of the seventh transistor is electrically connected to a third scanning signal terminal, a first electrode of the seventh transistor is electrically connected to the first control signal terminal, and a second electrode of the seventh transistor is electrically connected to the fifth node;

a control electrode of the eighth transistor is electrically connected to the reset signal terminal, a first electrode of the eighth transistor is electrically connected to the first initial signal terminal, and a second electrode of the eighth transistor is electrically connected to the fourth node;

a control electrode of the ninth transistor is electrically connected to the reset signal terminal, a first electrode of the ninth transistor is electrically connected to the second initial signal terminal, and a second electrode of the ninth transistor is electrically connected to the fifth node;

one plate of the first capacitor is electrically connected to the third node, and the other plate of the first capacitor is electrically connected to a third power supply terminal or the first node;

one plate of the second capacitor is electrically connected to the fourth node, and the other plate of the second capacitor is electrically connected to the fifth node; and the first transistor, the second transistor, and the fourth transistor through ninth transistor are of a same type and are all metal oxide semiconductor transistors.

12. The pixel circuit according to claim 1, wherein the current control sub-circuit comprises a first writing sub-circuit, a first storage sub-circuit and a driving sub-circuit;

the first writing sub-circuit, electrically connected to the first scanning signal terminal, the first data signal terminal and a third node, respectively, is configured to provide a signal of the first data signal terminal to the third node under control of the first scanning signal terminal;

the first storage sub-circuit, electrically connected to the third node and a third power supply terminal, respectively, is configured to store a voltage difference between signals of the third node and the third power supply terminal, or electrically connected to the first node and the third node, respectively, is configured to store a voltage difference between the signals of the first node and the third node; and the driving sub-circuit, electrically connected to the first power supply terminal, the first node and the third node, respectively, is configured to provide a driving current to the first node under control of the third node and the first power supply terminal.

13. The pixel circuit according to claim 12, wherein the first storage sub-circuit comprises a first capacitor, and the driving sub-circuit comprises a first transistor;

a control electrode of the first transistor is electrically connected to the third node, a first electrode of the first transistor is electrically connected to the first power supply terminal, and a second electrode of the first transistor is electrically connected to the first node; and one plate of the first capacitor is electrically connected to the third node, and the other plate of the first capacitor is electrically connected to the third power supply terminal or the first node.

14. The pixel circuit according to claim 12, wherein the first writing sub-circuit comprises a second transistor; and a control electrode of the second transistor is electrically connected to the first scanning signal terminal, a first electrode of the second transistor is electrically connected to the first data signal terminal, and a second electrode of the second transistor is electrically connected to the third node.

15. The pixel circuit according to claim 1, wherein the duration control sub-circuit comprises a second writing sub-circuit, a second storage sub-circuit, a reset sub-circuit and an output control sub-circuit;

the second storage sub-circuit, electrically connected to a fourth node and a fifth node, respectively, is configured to store a voltage difference between signals of the fourth node and the fifth node;

the second writing sub-circuit, electrically connected to the second scanning signal terminal, the third scanning signal terminal, the second data signal terminal, the first control signal terminal and the fifth node, respectively, is configured to provide a signal of the second data signal terminal to the fifth node under control of the second scanning signal terminal, and provide the signal of the first control signal terminal to the fifth node under control of the third scanning signal terminal;

the reset sub-circuit, electrically connected to the reset signal terminal, the first initial signal terminal, the second initial signal terminal, the fourth node and the fifth node, respectively, is configured to provide A signal of the first initial signal terminal to the fourth node and provide A signal of the second initial signal terminal to the fifth node under control of the reset signal terminal; and the output control sub-circuit, electrically connected to the first node, the second node and the fourth node, respectively, is configured to provide the signal of the first node to the second node under control of the fourth node.

16. The pixel circuit according to claim 15, wherein the output control sub-circuit comprises a fifth transistor, and the second storage sub-circuit comprises a second capacitor;

a control electrode of the fifth transistor is electrically connected to the fourth node, a first electrode of the fifth transistor is electrically connected to the first node, and a second electrode of the fifth transistor is electrically connected to the second node; and one plate of the second capacitor is electrically connected to the fourth node, and the other plate of the second capacitor is electrically connected to the fifth node.

17. The pixel circuit according to claim 15, wherein the second writing sub-circuit comprises a sixth transistor and a seventh transistor;

a control electrode of the sixth transistor is electrically connected to the second scanning signal terminal, a first electrode of the sixth transistor is electrically connected to the second data signal terminal, and a second electrode of the sixth transistor is electrically connected to the fifth node; and a control electrode of the seventh transistor is electrically connected to the third scanning signal terminal, a first electrode of the seventh transistor is electrically connected to the first control signal terminal, and a second electrode of the seventh transistor is electrically connected to the fifth node.

18. The pixel circuit according to claim 15, wherein the reset sub-circuit comprises an eighth transistor and a ninth transistor;

a control electrode of the eighth transistor is electrically connected to the reset signal terminal, a first electrode of the eighth transistor is electrically connected to the first initial signal terminal, and a second electrode of the eighth transistor is electrically connected to the fourth node; and a control electrode of the ninth transistor is electrically connected to the reset signal terminal, a first electrode of the ninth transistor is electrically connected to the second initial signal terminal, and a second electrode of the ninth transistor is electrically connected to the fifth node.

19. The pixel circuit according to claim 1, wherein the current control sub-circuit comprises a first transistor, a second transistor and a first capacitor, and the duration control sub-circuit comprises fifth transistor through ninth transistor and a second capacitor;

a control electrode of the first transistor is electrically connected to a third node, a first electrode of the first transistor is electrically connected to the first power supply terminal, and a second electrode of the first transistor is electrically connected to the first node;

a control electrode of the second transistor is electrically connected to the first scanning signal terminal, a first electrode of the second transistor is electrically connected to the first data signal terminal, and a second electrode of the second transistor is electrically connected to the third node;

a control electrode of the fifth transistor is electrically connected to a fourth node, a first electrode of the fifth transistor is electrically connected to the first node, and a second electrode of the fifth transistor is electrically connected to the second node;

a control electrode of the sixth transistor is electrically connected to the second scanning signal terminal, a first electrode of the sixth transistor is electrically connected to the second data signal terminal, and a second electrode of the sixth transistor is electrically connected to a fifth node;

a control electrode of the seventh transistor is electrically connected to the third scanning signal terminal, a first electrode of the seventh transistor is electrically connected to the first control signal terminal, and a second electrode of the seventh transistor is electrically connected to the fifth node;

a control electrode of the eighth transistor is electrically connected to the reset signal terminal, a first electrode of the eighth transistor is electrically connected to the first initial signal terminal, and a second electrode of the eighth transistor is electrically connected to the fourth node;

a control electrode of the ninth transistor is electrically connected to the reset signal terminal, a first electrode of the ninth transistor is electrically connected to the second initial signal terminal, and a second electrode of the ninth transistor is electrically connected to the fifth node;

one plate of the first capacitor is electrically connected to the third node, and the other plate of the first capacitor is electrically connected to a third power supply terminal or the first node;

one plate of the second capacitor is electrically connected to the fourth node, and the other plate of the second capacitor is electrically connected to the fifth node; and the first transistor, the second transistor, and the fifth transistor through ninth transistor are of a same type and are all metal oxide semiconductor transistors.

20. A display substrate, comprising a display area and a non-display area surrounding at least one side of the display area, a plurality of pixels being disposed in the display area, and the pixel circuit according to claim 1 being disposed within each of the pixels.

* * * * *